US011237926B2

(12) United States Patent
Yang et al.

(10) Patent No.: US 11,237,926 B2
(45) Date of Patent: *Feb. 1, 2022

(54) NETWORK VIRTUALIZATION POLICY MANAGEMENT SYSTEM

(71) Applicant: Shopify Inc., Ottawa (CA)

(72) Inventors: Chen-Yui Yang, Marlboro, NJ (US);
Paritosh Bajpay, Edison, NJ (US);
David H. Lu, Irving, TX (US);
Chaoxin Qiu, Austin, TX (US)

(73) Assignee: Shopify Inc., Ottawa (CA)

( * ) Notice: Subject to any disclaimer, the term of this patent is extended or adjusted under 35 U.S.C. 154(b) by 82 days.

This patent is subject to a terminal disclaimer.

(21) Appl. No.: 16/780,078

(22) Filed: Feb. 3, 2020

(65) Prior Publication Data

US 2020/0174898 A1   Jun. 4, 2020

Related U.S. Application Data

(63) Continuation of application No. 15/893,889, filed on Feb. 12, 2018, now Pat. No. 10,592,360, which is a continuation of application No. 15/456,996, filed on Mar. 13, 2017, now Pat. No. 9,892,007, which is a
(Continued)

(51) Int. Cl.
*G06F 11/20* (2006.01)
*G06F 9/50* (2006.01)
*G06F 9/455* (2018.01)
*G06F 11/16* (2006.01)

(52) U.S. Cl.
CPC ........ *G06F 11/203* (2013.01); *G06F 9/45558* (2013.01); *G06F 9/5022* (2013.01); *G06F 9/5077* (2013.01); *G06F 11/1658* (2013.01);

*G06F 11/202* (2013.01); *G06F 11/2033* (2013.01); *G06F 2009/4557* (2013.01);
(Continued)

(58) Field of Classification Search
CPC .. G06F 11/1658; G06F 11/202; G06F 11/203; G06F 11/2033; G06F 9/45558; G06F 9/5022; G06F 9/5077; G06F 2009/4557; G06F 2009/45595; G06F 2201/815
USPC ........................................................ 714/4.11
See application file for complete search history.

(56) References Cited

U.S. PATENT DOCUMENTS

| 7,966,614 B2 | 6/2011 | Chodroff et al. |
| 8,468,230 B2 | 6/2013 | Murata |
| 8,612,971 B1 | 12/2013 | Fitzgerald et al. |

(Continued)

OTHER PUBLICATIONS

Bhatia et al., "Hosting Virtual Networks on Commodity Hardware.", Jan. 2008 (Year: 2008).*

(Continued)

*Primary Examiner* — Chae M Ko
(74) *Attorney, Agent, or Firm* — GTC Law Group PC & Affiliates

(57) ABSTRACT

Concepts and technologies are disclosed herein for providing a network virtualization policy management system. An event relating to a service can be detected. A first policy that defines allocation of hardware resources to host the virtual network functions can be obtained, as can a second policy that defines deployment of the virtual network functions to the hardware resources. The hardware resources can be allocated based upon the first policy and the virtual network functions can be deployed to the hardware resources based upon the second policy.

20 Claims, 12 Drawing Sheets

Related U.S. Application Data continuation of application No. 14/512,625, filed on Oct. 13, 2014, now Pat. No. 9,594,649.

(52) U.S. Cl.
CPC .............. *G06F 2009/45595* (2013.01); *G06F 2201/815* (2013.01)

(56) References Cited

U.S. PATENT DOCUMENTS

| | | | |
|---|---|---|---|
| 8,639,783 | B1 | 1/2014 | Bakke et al. |
| 8,719,914 | B2 | 5/2014 | Edwards et al. |
| 8,732,705 | B2 | 5/2014 | White |
| 8,745,205 | B2 | 6/2014 | Anderson et al. |
| 8,793,684 | B2 | 7/2014 | Breitgand et al. |
| 9,053,577 | B2 | 6/2015 | Roche et al. |
| 9,542,222 | B2 | 1/2017 | Mousseau et al. |
| 9,594,649 | B2 | 3/2017 | Yang et al. |
| 9,838,253 | B2 * | 12/2017 | Wang ...................... H04L 41/04 |
| 9,892,007 | B2 | 2/2018 | Yang et al. |
| 2007/0294676 | A1 | 12/2007 | Mellor et al. |
| 2008/0205377 | A1 | 8/2008 | Chao et al. |
| 2008/0222633 | A1 | 9/2008 | Kami |
| 2009/0250833 | A1 | 10/2009 | Muller et al. |
| 2010/0275204 | A1 | 10/2010 | Kamura et al. |
| 2013/0007734 | A1 | 1/2013 | McCloy |
| 2013/0014107 | A1 | 1/2013 | Kirchhofer |
| 2013/0111033 | A1 | 5/2013 | Mao et al. |
| 2013/0117549 | A1 | 5/2013 | Lin |
| 2013/0219391 | A1 | 8/2013 | Lee et al. |
| 2013/0247048 | A1 | 9/2013 | Le Saux et al. |
| 2013/0305243 | A1 | 11/2013 | Hiki |
| 2013/0332771 | A1 | 12/2013 | Salapura et al. |
| 2014/0040975 | A1 * | 2/2014 | Raleigh ................ G06Q 30/016 726/1 |
| 2014/0157261 | A1 | 6/2014 | Toeroe |
| 2014/0173213 | A1 | 6/2014 | Beveridge |
| 2014/0181366 | A1 | 6/2014 | Venkatesh et al. |
| 2014/0201374 | A1 | 7/2014 | Ashwood-Smith et al. |
| 2014/0298338 | A1 | 10/2014 | Doi |
| 2014/0376555 | A1 | 12/2014 | Choi et al. |
| 2014/0380314 | A1 | 12/2014 | Shimada et al. |
| 2015/0007177 | A1 | 1/2015 | Tobo et al. |
| 2015/0026681 | A1 | 1/2015 | Lin et al. |
| 2015/0082308 | A1 | 3/2015 | Kiess et al. |
| 2015/0106806 | A1 | 4/2015 | Reddy et al. |
| 2015/0120931 | A1 | 4/2015 | Padala et al. |
| 2015/0127970 | A1 | 5/2015 | Bivens et al. |
| 2015/0128139 | A1 | 5/2015 | Suzuki |
| 2015/0195137 | A1 | 7/2015 | Kashyap et al. |
| 2015/0212856 | A1 | 7/2015 | Shanmuganathan et al. |
| 2015/0277791 | A1 | 10/2015 | Li et al. |
| 2015/0286492 | A1 | 10/2015 | Breitgand et al. |
| 2015/0339150 | A1 | 11/2015 | Yanagisawa et al. |
| 2015/0378764 | A1 | 12/2015 | Sivasubramanian et al. |
| 2015/0378921 | A1 | 12/2015 | Karippara et al. |
| 2016/0057102 | A1 * | 2/2016 | Wei ...................... H04L 61/2007 709/226 |
| 2016/0080496 | A1 | 3/2016 | Falanga et al. |
| 2016/0103698 | A1 | 4/2016 | Yang et al. |
| 2016/0253195 | A1 | 9/2016 | Banzhaf et al. |
| 2017/0054603 | A1 | 2/2017 | Kulkarni et al. |
| 2017/0185494 | A1 | 6/2017 | Yang et al. |
| 2017/0200102 | A1 | 7/2017 | Kapasi et al. |
| 2018/0165167 | A1 | 6/2018 | Yang et al. |

OTHER PUBLICATIONS

"NEC Virtualized Evolved Packet Core-vEPC", White Paper TE-524262, NEC Corporation, 2014, 11 pages.

"Network Functions Virtualisation (NFV); Use Cases", Group Specification, VI.I.1, ETSI, Oct. 2013, 50 pages.

U.S. Appl. No. 14/512,625, "U.S. Appl. No. 14/512,625 Non-Final Office Action dated Jun. 1, 2016", Chen-Yui Yang, 15 pages.

U.S. Appl. No. 14/512,625, "U.S. Appl. No. 14/512,625 Notice of Allowance dated Oct. 26, 2016", Chen-Yui Yang, 8 pages.

U.S. Appl. No. 15/456,996, "U.S. Appl. No. 15/456,996 Non-Final Office Action dated May 2, 2017", Chen-Yui Yang, 6 pages.

U.S. Appl. No. 15/456,996, "U.S. Appl. No. 15/456,996 Notice of Allowance dated Sep. 11, 2017", Chen-Yui Yang, 8 pages.

Basilinger, et al., "Virtualizing network services—the telecom cloud", Ericsson Review, Ericsson, Mar. 28, 2014, 10 pages.

* cited by examiner

FIG. 8

NETWORK VIRTUALIZATION POLICY MANAGEMENT SYSTEM

CROSS-REFERENCE TO RELATED APPLICATIONS

This application is a continuation of and claims priority to U.S. patent application Ser. No. 15/893,889, entitled "Network Virtualization Policy Management System," filed Feb. 12, 2018.

U.S. patent application Ser. No. 15/893,889 is a continuation of and claims priority to U.S. patent application Ser. No. 15/456,996, entitled "Network Virtualization Policy Management System," filed Mar. 13, 2017, now issued as U.S. Pat. No. 9,892,007.

U.S. patent application Ser. No. 15/456,996 is a continuation of and claims priority to U.S. patent application Ser. No. 14/512,625, entitled "Network Virtualization Policy Management System," filed Oct. 13, 2014, now U.S. Pat. No. 9,594,649.

Each of the aforementioned applications/patents is hereby incorporated by reference in its entirety.

BACKGROUND

Virtualization of services can include creating software implementations of hardware such as computers, networking equipment, or other devices, and deploying software that corresponds to modules, applications, application components, and/or hardware controllers to the software implementations of the hardware. Thus, virtualization can be used to convert a physical network built by multiple hardware devices into a software implementation of a network. Similarly, hardware devices can be converted into software implementations of the devices, and services that are tightly coupled to hardware can be converted into loosely coupled applications or modules that can be hosted or executed by common off-the-shelf ("COTS") hardware.

Virtualization can be used to reduce costs of activating a service and/or for other reasons. In the context of service activation, virtualization can allow services and hardware to be decoupled, which can obviate the need to obtain a hardware-software device that provides the service. Rather, software code for providing the service can be written and deployed to COTS hardware. This approach can reduce the lead time from service conception to activation.

SUMMARY

The present disclosure is directed to a network virtualization policy management system ("policy management system"). The policy management system can be operated by one or more computing systems that can include a memory or other computer readable medium and a processor. The processor can execute one or more modules, applications, services, or the like to apply various policies to creation, replication, and/or relocation of services in a virtualized network. The policy management system can receive a request or can detect a failure, which can prompt the policy management system to replicate or relocate a server, virtual machines, and/or virtual network functions.

The request can correspond to a service order, a work order, a request to replicate a service, a request to move a service, a request to scale a service, a request to create a new service, or the like. The failure can be detected by receiving failure data, which can correspond to an alert; an alarm; an error code; a work order to move applications or components; other indications of diminished or failed performance associated with a service or hardware hosting or executing the service, a virtual machine or virtual network function associated with the service; combinations thereof; or the like. In response to the request, the policy management system can initiate a replication process. In response to the failure data or a request or relocate a service, the policy management system can initiate a relocation process.

In an example replication process, the policy management system (via execution of a virtual machine replication management module in some embodiments) can identify one or more virtual network functions and/or virtual machines associated with the service requested by way of the request. In various embodiments, the policy management system can identify the virtual network functions and/or virtual machines that can support the service, and can obtain one or more policies for assigning hardware and/or deploying virtual network functions and/or virtual machines to the hardware to provide the requested service. The policies relating to assignment and deployment of the virtual machines and/or the virtual network functions can include design templates, replication policies, failover policies, hardware assignment policies, redundancy policies, other replication policies, or the like, one or more of which can be stored in a virtual network function and virtual machine configuration design policy module or elsewhere.

The policy management system can identify available hardware resources, and apply the policies to generate a hardware allocation plan for the available hardware. The hardware allocation plan can accommodate various redundancy schemes such as intra-site redundancy, inter-site redundancy, and/or internal redundancy; affinity or non-affinity rules; assignment and/or orchestration policies, other policies, or the like. The policy management system can allocate hardware to support the service and deploy the virtual network functions and/or virtual machines to the hardware that was allocated to create the service.

In a relocation process, the policy management system can (via execution of a virtual machine relocation management module, in some embodiments) identify one or more virtual network functions and/or virtual machines associated with the service that has experienced a failure or other diminished performance. In various embodiments, the policy management system can identify the virtual network functions and/or virtual machines that can support the service, and can obtain one or more policies for relocating hardware, virtual machines, and/or virtual network functions for the service that experienced the failure. As noted above, the policies can include design templates, relocation policies, hardware assignment policies, redundancy policies, other relocation policies, or the like, one or more of which can be stored in the virtual network function and virtual machine configuration design policy module or elsewhere.

The policy management system can identify available hardware resources, and apply the policies to generate a hardware allocation plan for the available hardware. A hardware de-allocation plan also can be formulated, in some embodiments. The hardware allocation plan can accommodate various redundancy schemes such as intra-site redundancy, inter-site redundancy, and/or geo-redundancy. The policy management system can allocate hardware to support the service and deploy the virtual network functions and/or virtual machines to the hardware that was allocated to effectively create the service. The policy management system also can de-allocate hardware or instruct other devices or modules to de-allocate the hardware.

According to one aspect of the concepts and technologies disclosed herein, a method is disclosed. The method can include detecting, at a processor, an event relating to a service and identifying, by the processor, virtual machines and virtual network functions that provide the service. The method also can include obtaining, by the processor, a first policy that can include a physical resource assignment policy that defines allocation of hardware resources to host the virtual machines and the virtual network functions and obtaining, by the processor, a second policy that can include a replication policy or a relocation policy that can define deployment of the virtual machines and the virtual network functions to the hardware resources. The method also can include allocating, by the processor, the hardware resources based upon the first policy, and deploying, by the processor, the virtual machines and the virtual network functions to the hardware resources based upon the second policy.

In some embodiments, the event can include a request, the second policy can include a replication policy, and deploying the virtual machines and the virtual network functions can include replicating the virtual machines and the virtual network functions. In some embodiments, the event can include a failure, the second policy can include a relocation policy, and deploying the virtual machines and the virtual network functions can include relocating the virtual machines and the virtual network functions from failed hardware resources to the hardware resources.

In some embodiments, the second policy can include a redundancy policy that defines deployment of the virtual machines and the virtual network functions to the hardware resources to maintain a redundancy scheme. The redundancy scheme can include a geo-redundancy requirement, an inter-site redundancy requirement, and an internal redundancy requirement. In some embodiments, the method can further include identifying, by the processor, the hardware resources by identifying available hardware resources and outputting, by the processor, a hardware allocation plan based upon applying the first policy and the second policy to a first input relating to the hardware resources and a second input relating to the virtual machines and the virtual network functions. Allocating the hardware resources can include implementing the hardware allocation plan.

In some embodiments, the method can further include identifying, by the processor, the hardware resources by identifying available hardware resources, outputting, by the processor, a hardware allocation plan based upon applying the first policy and the second policy to a first input relating to the hardware resources and a second input relating to the virtual machines and the virtual network functions, and outputting, by the processor, a hardware de-allocation plan based upon the applying. Allocating the hardware resources can include implementing the hardware allocation plan and the hardware de-allocation plan. In some embodiments, deploying the virtual machines and the virtual network functions can include determining a failover implementation and deploying the virtual machines and the virtual network functions based upon the failover implementation determined. The failover implementation can define activation of redundant virtual machines in the event of a failure.

According to another aspect of the concepts and technologies disclosed herein, a system is disclosed. The system can include a processor and a memory. The memory can store computer-executable instructions that, when executed by the processor, cause the processor to perform operations. The operations can include detecting an event relating to a service, identifying virtual machines and virtual network functions that provide the service, obtaining a first policy that can include a physical resource assignment policy that can define allocation of hardware resources to host the virtual machines and the virtual network functions, obtaining a second policy that can include a replication policy or a relocation policy that can define deployment of the virtual machines and the virtual network functions to the hardware resources, allocating the hardware resources based upon the first policy, and deploying the virtual machines and the virtual network functions to the hardware resources based upon the second policy.

In some embodiments, detecting the event can include receiving a request for a new service, the second policy can include a replication policy, and deploying the virtual machines and the virtual network functions can include replicating the virtual machines and the virtual network functions. In some embodiments, detecting the event can include receiving failure data relating to a site, the second policy can include a relocation policy, and deploying the virtual machines and the virtual network functions can include relocating the virtual machines and the virtual network functions from failed hardware resources at the site to the hardware resources.

In some embodiments, the second policy can include a redundancy policy that defines deployment of the virtual machines and the virtual network functions to the hardware resources to maintain a redundancy scheme. The redundancy scheme can include a geo-redundancy requirement, an inter-site redundancy requirement, and an internal redundancy requirement. In some embodiments, deploying the virtual machines and the virtual network functions can include deploying multiple instances of the virtual machines and the virtual network functions to a first geographic location and deploying copies of the multiple instances of the virtual machines and the virtual network functions to a second geographic location to satisfy the redundancy scheme.

In some embodiments, the computer-executable instructions, when executed by the processor, cause the processor to perform operations further including outputting a hardware allocation plan based upon applying the first policy and the second policy to a first input relating to the hardware resources and a second input relating to the virtual machines and the virtual network functions. Allocating the hardware resources can include implementing the hardware allocation plan. In some embodiments, the computer-executable instructions, when executed by the processor, cause the processor to perform operations further including outputting a hardware de-allocation plan based upon the applying. Allocating the hardware resources further can include implementing the hardware de-allocation plan.

According to yet another aspect, a computer storage medium is disclosed. The computer storage medium can have computer-executable instructions stored thereon that, when executed by a processor, cause the processor to perform operations. The operations can include detecting an event relating to a service, identifying virtual machines and virtual network functions that provide the service, obtaining a first policy that can include physical resource assignment policy that can define allocation of hardware resources to host the virtual machines and the virtual network functions, obtaining a second policy that can include a replication policy or a relocation policy that can define deployment of the virtual machines and the virtual network functions to the hardware resources, allocating the hardware resources based upon the first policy, and deploying the virtual machines and the virtual network functions to the hardware resources based upon the second policy.

In some embodiments, detecting the event can include receiving a request for a new service, the second policy can include a replication policy, and deploying the virtual machines and the virtual network functions can include replicating the virtual machines and the virtual network functions. In some embodiments, detecting the event can include receiving failure data relating to a site, the second policy can include a relocation policy, and deploying the virtual machines and the virtual network functions can include relocating the virtual machines and the virtual network functions from failed hardware resources at the site to the hardware resources.

In some embodiments, the second policy can include a redundancy policy that defines deployment of the virtual machines and the virtual network functions to the hardware resources to maintain a redundancy scheme including a geo-redundancy requirement, an inter-site redundancy requirement, and an internal redundancy requirement. In some embodiments, the computer-executable instructions, when executed by the processor, cause the processor to perform operations further including outputting a hardware allocation plan based upon applying the first policy and the second policy to a first input relating to the hardware resources and a second input relating to the virtual machines and the virtual network functions. Allocating the hardware resources can include implementing the hardware allocation plan.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

BRIEF DESCRIPTION OF THE DRAWINGS

FIGS. 7-8 are line diagrams showing aspects of assigning hardware, according to an illustrative embodiment of the concepts and technologies described herein.

DETAILED DESCRIPTION

Figure 1A:
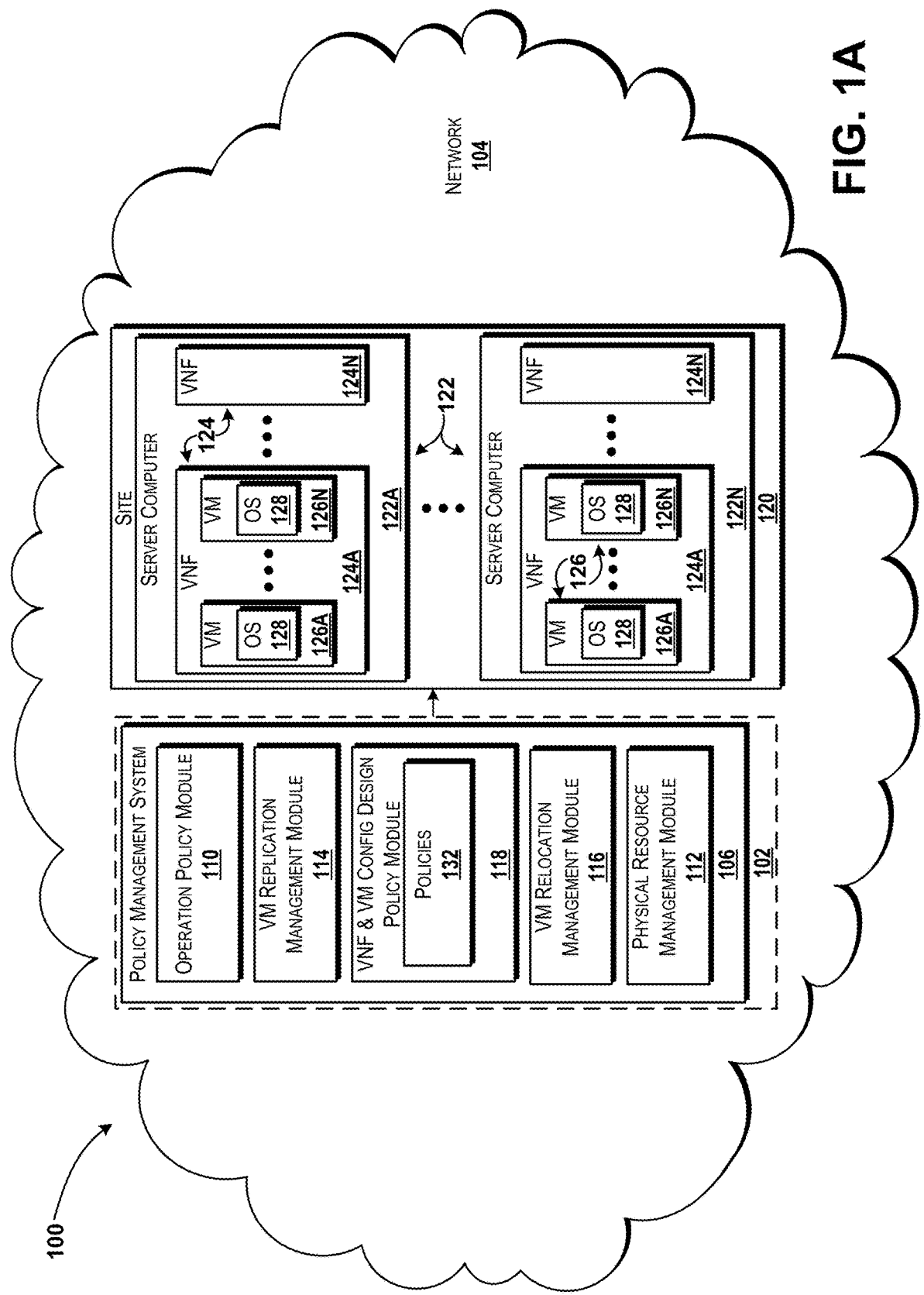
FIGS. 1A-1C are system diagrams illustrating an illustrative operating environment for various embodiments of the concepts and technologies described herein.

The following detailed description is directed to a network virtualization policy management system ("policy management system"). The policy management system can be operated by one or more computing systems that can include a memory or other computer readable medium and a processor. The processor can execute one or more modules, applications, services, or the like to apply various policies to creation, replication, and/or relocation of services in a virtualized network. The policy management system can receive a request or detect a failure, either of which can effectively be a work order for a replication or relocation process. In some embodiments, the policy management system detects the failure by receiving failure data.

The request can correspond to a service order, a work order, a request to replicate a service, a request to move a service, a request to scale a service, a request to create a new service, or the like. The failure data can correspond to an alert; an alarm; an error code; a work order to move applications or components; other indications of diminished or failed performance associated with a service or hardware hosting or executing the service, a virtual machine or virtual network function associated with the service; combinations thereof; or the like. In response to the request, the policy management system can initiate a replication process. In response to the failure data or a request or relocate a service, the policy management system can initiate a relocation process.

In an example replication process, the policy management system can identify one or more virtual network functions and/or virtual machines associated with the service requested by way of the request. In various embodiments, the policy management system can identify the virtual network functions and/or virtual machines that can support the service, and can obtain one or more policies for assigning hardware and/or deploying virtual network functions and/or virtual machines to the hardware to provide the requested service. The policies relating to assignment and deployment of the virtual machines and/or the virtual network functions can include design templates, replication policies, failover policies, hardware assignment policies, redundancy policies, other replication policies, or the like, one or more of which can be stored in a virtual network function and virtual machine configuration design policy module or elsewhere.

The policy management system can identify available hardware resources, and apply the policies to generate a hardware allocation plan for the available hardware. The hardware allocation plan can accommodate various redundancy schemes such as intra-site redundancy, inter-site redundancy, and/or internal redundancy; affinity or non-affinity rules; assignment and/or orchestration policies, other policies, or the like. The policy management system can allocate hardware to support the service and deploy the virtual network functions and/or virtual machines to the hardware that was allocated to create the service.

In a relocation process, the policy management system can identify one or more virtual network functions and/or virtual machines associated with the service that has experienced a failure or other diminished performance. In various embodiments, the policy management system can identify the virtual network functions and/or virtual machines that can support the service, and can obtain one or more policies for relocating hardware, virtual machines, and/or virtual network functions for the service that experienced the failure. As noted above, the policies can include design templates, relocation policies, hardware assignment policies, redundancy policies, other relocation policies, or the like, one or more of which can be stored in the virtual network function and virtual machine configuration design policy module or elsewhere.

The policy management system can identify available hardware resources, and apply the policies to generate a hardware allocation plan for the available hardware. A hardware de-allocation plan also can be formulated, in some embodiments. The hardware allocation plan can accommodate various redundancy schemes such as intra-site redundancy, inter-site redundancy, and/or geo-redundancy. The policy management system can allocate hardware to support the service and deploy the virtual network functions and/or virtual machines to the hardware that was allocated to effectively create the service. The policy management system also can de-allocate hardware or instruct other devices or modules to de-allocate the hardware.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1B:
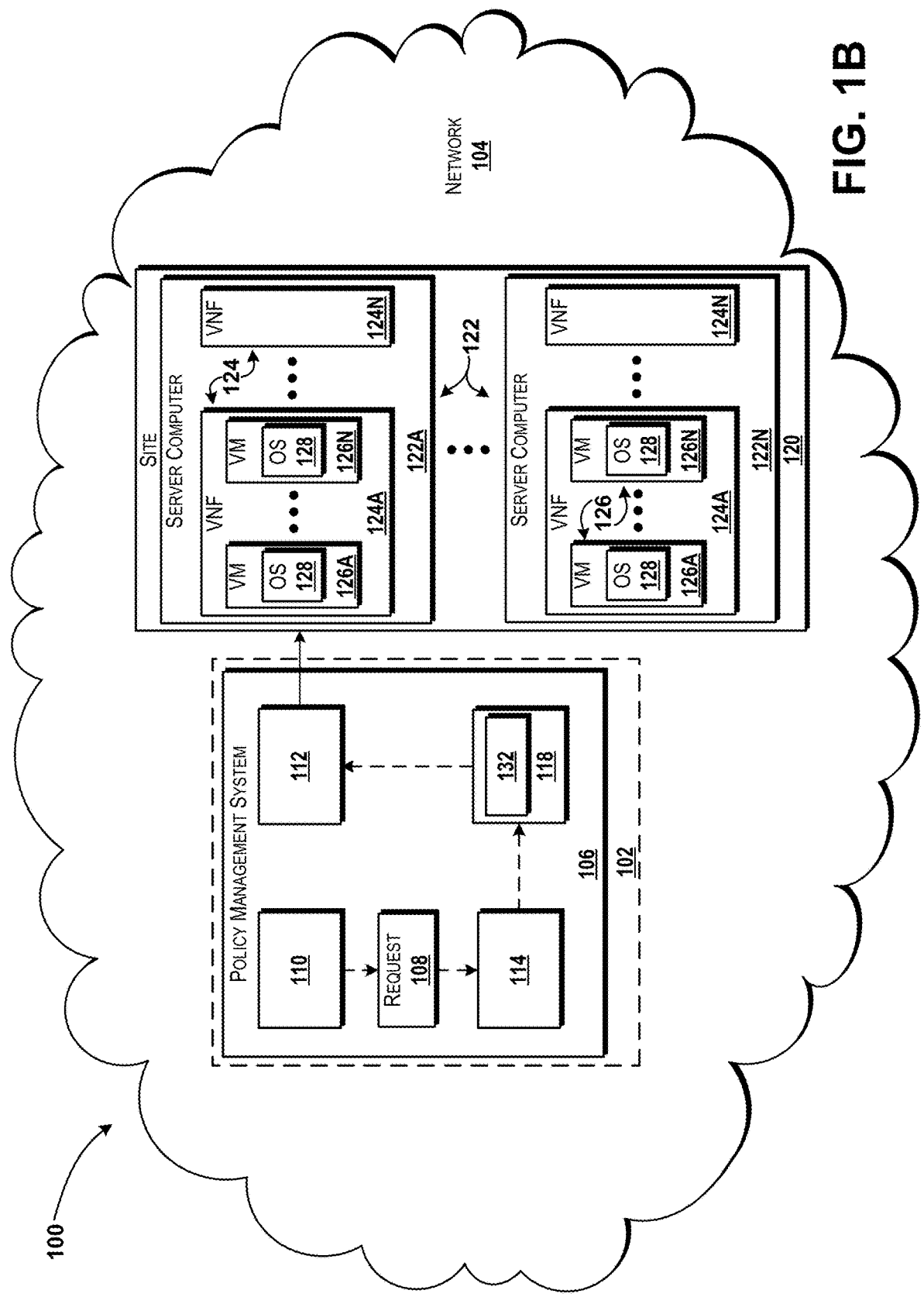
Figure 1C:
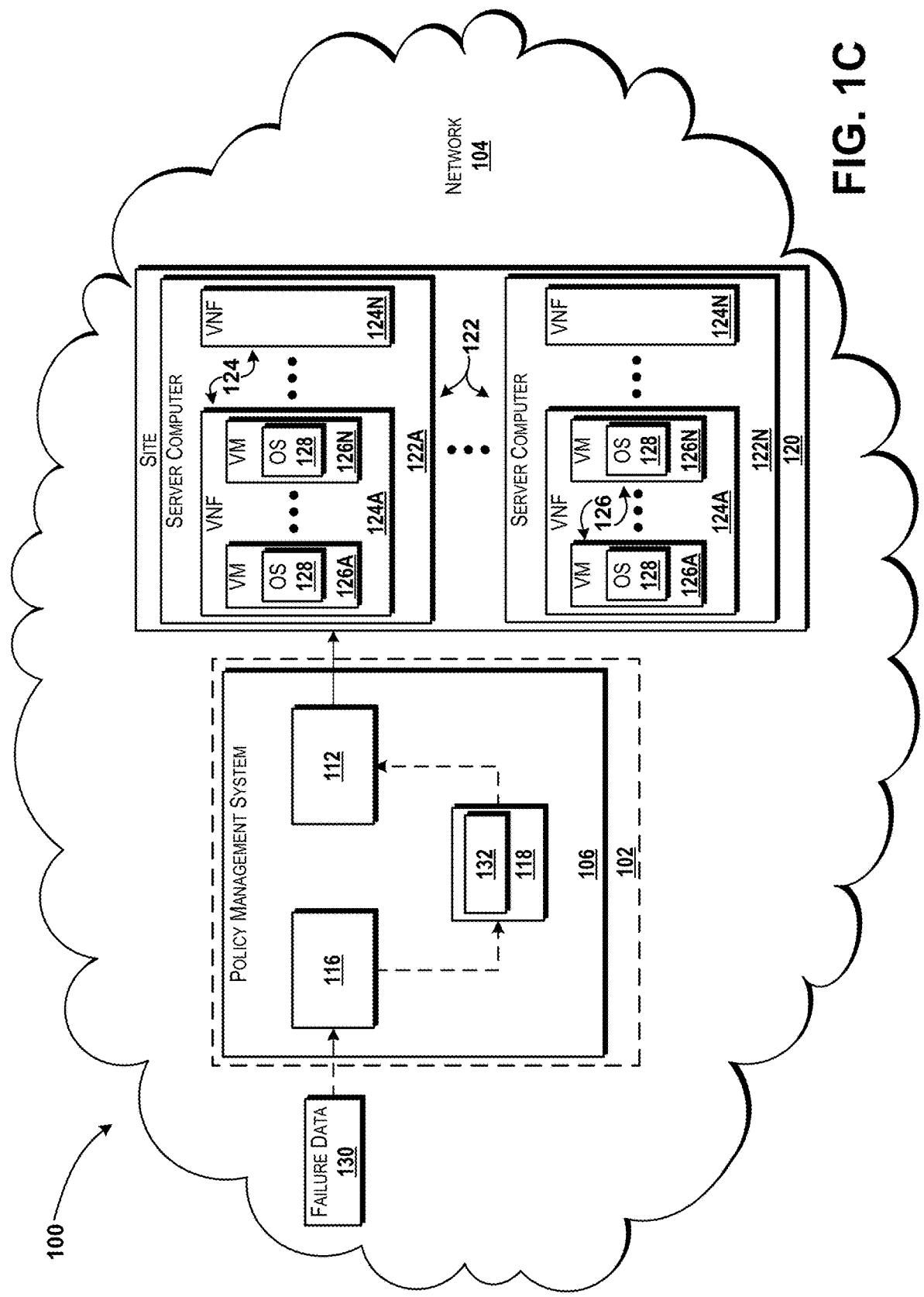

Referring now to FIGS. 1A-1C, aspects of an operating environment 100 for various embodiments of the concepts and technologies disclosed herein for providing a network virtualization policy management system will be described, according to an illustrative embodiment. The operating environment 100 shown in FIG. 1A includes a computing device 102. The computing device 102 can operate in communication with and/or as part of a communications network ("network") 104.

According to various embodiments of the concepts and technologies described herein, the functionality of the computing device 102 may be provided by one or more server computers, desktop computers, mobile telephones or smartphones, laptop computers, tablet computers, other computing systems, and the like. It should be understood that the functionality of the computing device 102 can be provided by a single device, by two similar devices, and/or by two or more dissimilar devices. For purposes of describing the concepts and technologies disclosed herein, the computing device 102 is described herein as a personal computer. It should be understood that this embodiment is illustrative, and should not be construed as being limiting in any way.

The computing device 102 can execute an operating system (not shown in FIGS. 1A-1C) and one or more application programs such as, for example, an ordering application, a network monitoring application, a web browser, other applications, combinations thereof, or the like (not shown in FIG. 1A). The operating system can include a computer program for controlling the operation of the computing device 102. The application programs can include executable programs configured to execute on top of the operating system to provide various functions to the computing device 102.

According to various embodiments of the concepts and technologies described herein, the computing device 102 can be used by a network operator, network engineer, other network personnel, and/or other entities to interact with and/or control a network virtualization policy management system (referred to herein as a "policy management system") 106. The computing device 102 also can host and/or execute the policy management system 106 as will be explained in more detail hereinbelow. The policy management system 106 can execute various modules to analyze requests (e.g., the request 108 shown in FIG. 1B), apply policies to the requests, deploy services responsive to requests by replicating resources, detect failures on a network, relocate services or functions based upon the failures, or the like. These and other functions associated with the policy management system 106 will be illustrated and described in more detail below.

The computing device 102 can host and/or execute the policy management system 106, which can include one or more services, engines, applications, modules, or other computer-executable code. The computer-executable code can be stored in a computer readable medium as defined herein (referred to as a "memory" for purposes of simplifying the description). When executed by a processor (not shown in FIGS. 1A-1C), the computer-executable code can provide the various functions of the policy management system 106 illustrated and described herein. Thus, while the specific modules, applications, or services illustrated and described herein are not necessarily mentioned with regard to each function provided by those modules, applications, or services, the policy management system 106 can execute these modules, applications, or services to provide the functionality described below. It should be understood that this example is illustrative and therefore should not be construed as being limiting in any way.

In the embodiment illustrated in FIGS. 1A-1C, the policy management system 106 can include an operation policy module 110, a physical resource management module 112, a virtual machine ("VM") replication management module 114, a virtual machine relocation management module 116, and a virtual network function and virtual machine configuration design policy module 118. Functionality associated with each of these components will be described in additional detail below. In FIGS. 1A-1C, the operation policy module 110, the physical resource management module 112, the virtual machine replication management module 114, the virtual machine relocation management module 116, and the virtual network function and virtual machine configuration design policy module 118 are illustrated as components of the policy management system 106. It should be understood that each of these components, or combinations thereof, may be embodied as or in stand-alone devices or components thereof operating as part of or in communication with the computing device 102, the network 104, and/or the policy management system 106. As such, the illustrated embodiment should be understood as being illustrative of only some contemplated embodiments and should not be construed as being limiting in any way.

The operation policy module 110 can be configured to detect submission of a request such as the request 108 shown in FIG. 1B. As noted above, the request 108 can correspond to a request for a service, as well as replication of resources associated with services. As will be explained in more detail below, the resources can include various resources located at or in communication with a site 120. For example, the resources can include one or more server computers 122A-N (hereinafter collectively and/or generically referred to as a "server computer 122"). The server computers 122 can host one or more virtual network functions 124A-N (hereinafter collectively and/or generically referred to as "virtual network functions 124" and labeled as "VNF" in FIGS. 1A-1C). The virtual network functions 124 may include or be defined by one or more virtual machines 126A-126N (hereinafter collectively and/or generically referred to as "virtual machines 126" and labeled as "VM" in FIGS. 1A-1C). Details of the replication functionality of the policy management system 106 will be illustrated and described below, particularly with reference to FIG. 1B.

As used herein, the term "virtual machine," when used to refer to the virtual machines 126, can be used to refer to a software implementation of a computer system. The virtual machines 126 can execute programs in a manner that may be similar or even identical to a hardware computer. One or more of the virtual machines 126 can host an operating system (labeled "OS" in FIGS. 1A-1C) 128. The operating system 128 can be executed by the associated virtual machine 126 to control the operation of the virtual machine 126. In some embodiments, the operating system 128 can be a fully functional operating system that can be confined to operate in an associated virtual machine 126. It should be understood that this example is illustrative and therefore should not be construed as being limiting in any way.

As used herein, the term "virtual network function," when used to refer to the virtual network functions 124, can be used to refer to a particular virtualized function, application, or service. Thus, the virtual network functions 124 can correspond to virtual applications, functions, or services, and/or collections of virtual applications, functions, and/or services. The virtual network functions 124 therefore can include multiple virtual machines 126, in some embodiments. For example, if a particular virtual network function 124 corresponds to a virtualized version of an email service, one virtual machine 126 may provide the functionality of a mail server, a second virtual machine 126 may provide the functionality of a mail database, a third virtual machine 126 may provide the functionality of a router, or the like. It should be understood that this example is illustrative and therefore should not be construed as being limiting in any way.

The operation policy module 110 also can be configured to detect receipt of data indicating a failure, an error, or other event ("failure data") such as the failure data 130 shown in FIG. 1C. The failure data 130 can be generated by one or more entities in or associated with the network 104, for example monitoring applications or devices, alerting mechanisms, programmers, combinations thereof, or the like. According to various embodiments of the concepts and technologies described herein, the failure data 130 can indicate a failure or error associated with one or more of the resources associated with the site 120, for example one or more of the server computers 122, one or more of the virtual network functions 124, and/or one or more of the virtual machines 126. It should be understood that this example is illustrative and therefore should not be construed as being limiting in any way.

Upon detecting the request 108 or the failure data 130, the operation policy module 110 can trigger application of the concepts and technologies described herein to address the request 108 and/or the failure data 130 by replicating resources, relocating resources, and/or taking other actions as illustrated and described herein. The operation policy module 110 also can trigger interaction by various network personnel such as network engineers, network designers, network operations, and/or the like. Thus, the operation policy module 110 can recognize receipt of a trigger event such as the request 108 and/or the failure data 130, and initiate a response to the trigger event received.

The physical resource management module 112 can be configured to monitor and/or interact with the site 120 and/or other resources in communication with the policy management system 106. Based upon the monitoring, the physical resource management module 112 can identify available resources that are accessible by the policy management system 106 and/or that can host one or more virtual network functions 124, and/or virtual machines 126. In some embodiments the site 120 and the computing device 102 may be owned, operated, and/or controlled by different entities. In some other embodiments, the site 120 and the computing device 102 can be owned, operated, and/or controlled by the same entities.

In some embodiments, the physical resource management module 112 can identify, during a replication and/or relocation process as illustrated and described herein, hardware resources (e.g., server computers 122) that have the most available resources at a particular time. The physical resource management module 112 can identify the hardware by monitoring workloads, work division, or the like associated with the site 120 and/or other hardware resources. In some embodiments, the physical resource management module 112 can receive monitoring data or other information describing load and/or usage of hardware resources as input, and can generate data corresponding to a set of available resources as output. It should be understood that this example is illustrative and therefore should not be construed as being limiting in any way.

The virtual machine replication management module 114 can be configured to execute a replication process. In various embodiments, the virtual machine replication management module 114 can apply various policies 132 as illustrated and described herein to a determined set of hardware resources to generate a hardware allocation plan and/or to generate a virtual network function 124 and virtual machine 126 allocation plan. It can be appreciated that the virtual machine replication management module 114 can be triggered by receipt of a request such as the request 108 at the policy management system 106, in some embodiments. Thus, the virtual machine replication management module 114 can be triggered in response to the policy management system 106 detecting a planned event such as deployment of a new site, an upgrade, a launch of a new service, combinations thereof, or the like.

The virtual machine relocation management module 116 can be configured to execute a relocation process. In various embodiments, the virtual machine relocation management module 116 can apply the policies 132 as illustrated and described herein to a determined set of hardware resources to generate a hardware allocation plan and/or to generate a virtual network function 124 and virtual machine 126 allocation plan. It can be appreciated that the virtual machine relocation management module 116 can be triggered by receipt of the failure data 130 at the policy management system 106, in some embodiments. Thus, the virtual machine relocation management module 116 can be triggered in response to the policy management system 106 detecting an unplanned event such as failure of a server computer 122; failure of a virtual network function 124;

failure of a virtual machine 126; congestion to, at, through, or from the site 120 to other entities operating on or in communication with the network 104; other types of failures or events; combinations thereof; or the like.

The virtual network function and virtual machine configuration design policy module 118 can correspond to a repository for the policies 132 and/or a module or application that can apply the policies, according to various embodiments. In some embodiments, the functionality of the virtual network function and virtual machine configuration design policy module 118 can be provided by one or more databases, server computers, desktop computers, mobile telephones, laptop computers, other computing systems, and the like. The policies 132 can include, but are not limited to, pre-tested and/or preconfigured templates for creating and/or allocating virtual network functions 124 and/or virtual machines 126; dimensioning templates for planning and/or deploying the virtual network functions 124; redundancy policies for creating various types of redundancy in sites 120 and/or among multiple sites 120; failover implementations or policies for defining how redundant virtual network functions 124 and/or virtual machines 126 are utilized; assignment policies for defining how hardware is assigned and/or configured; combinations thereof; or the like.

Thus, the virtual network function and virtual machine configuration design policy module 118 can include and/or apply various policies for planning and/or deploying services and/or components thereof at physical resources. The policies 132 can be used to plan and deploy virtual network functions 124 and/or virtual machines 126 based on requests 108 and/or failures, or the like. It should be understood that these examples are illustrative and therefore should not be construed as being limiting in any way. Additional details of various contemplated policies 132 are described in additional detail below with reference to FIG. 3.

In practice, a request 108 or failure data 130 can be received at the policy management system 106. The request 108 can correspond to a service order, a request to replicate a service, a request to create a new service, or the like. The failure data 130 can correspond to an alert, alarm, error code, or other indication of diminished or failed performance associated with a service or hardware hosting or executing the service, a virtual machine 126 or virtual network function 124 associated with the service, combinations thereof, or the like. In response to the request 108, the policy management system 106 can initiate a replication process. In response to the failure data 130, the policy management system 106 can initiate a relocation process. Each of these processes will be illustrated and described in more detail below, but are briefly illustrated and described herein with reference to FIGS. 1B and 1C respectively.

Turning now to FIG. 1B, the replication process is now briefly described. The policy management system 106 can receive a request 108. The request 108 can correspond to an order or request for a service, a request to replicate one or more functions or virtual resources associated with a service, combinations thereof, or the like. The request 108 also can include data that can describe a service request, a relocation requested, combinations thereof, or the like. In particular, the operation policy module 110 can send the request 108 to the virtual machine replication management module 114. The virtual machine replication management module 114 can apply various policies 132 as illustrated and described herein to a determined set of hardware resources to generate a hardware allocation plan and/or to generate a virtual network function 124 and virtual machine 126 allocation plan. Thus, as shown in FIG. 1B, the virtual machine replication management module 114 can access the policies 132 at the virtual network function and virtual machine configuration design policy module 118.

With respect to a replication process, the policy management system 106 can identify one or more virtual network functions 124 and/or virtual machines 126 associated with the service requested by way of the request 108. In various embodiments, the policy management system 106 can identify the virtual network functions 124 and/or virtual machines 126 that can support the service, and can obtain one or more policies 132 for assigning hardware and/or deploying virtual network functions 124 and/or virtual machines 126 for the service. The policies 132 relating to assignment and deployment of the virtual machines 126 and/or the virtual network functions 124 can include design templates, replication policies, failover policies, hardware assignment policies, redundancy policies, or the like, one or more of which can be stored in the virtual network function and virtual machine configuration design policy module 118 or elsewhere.

The flow can then proceed to the physical resource management module 112 of the policy management system 106, which can identify available hardware resources, and apply the policies 132 to actualize the hardware allocation plan for the available hardware. The hardware allocation plan can accommodate various redundancy schemes such as intra-site redundancy, inter-site redundancy, and/or internal redundancy. The physical resource management module 112 of the policy management system 106 can allocate hardware to support the service and deploy the virtual network functions 124 and/or virtual machines 126 to the hardware that was allocated to effectively create the service. Additional details of the replication process will be illustrated and described in more detail below. As such, it should be understood that the above example is illustrative and should not be construed as being limiting in any way.

Turning now to FIG. 1C, the replication process is now briefly described. With respect to a relocation process, the policy management system 106 can identify one or more virtual network functions 124 and/or virtual machines 126 associated with the service that has experienced a failure. The failure can be indicated, for example, by the failure data 130, which can be received at the virtual machine relocation management module 116 of the policy management system 106 from one or more entities operating on the network 104, in some embodiments. In various embodiments, the policy management system 106 can identify the virtual network functions 124 and/or virtual machines 126 that can support the service, and can obtain one or more policies 132 for relocating hardware, virtual machines 126, and/or virtual network functions 124 for the service that has experienced the failure indicated by the failure data 130. As noted above, the policies 132 can include design templates, relocation policies, hardware assignment policies, redundancy policies, or the like, one or more of which can be stored in the virtual network function and virtual machine configuration design policy module 118 or elsewhere. As such, in FIG. 1C, the execution of the relocation process flows from the virtual machine relocation management module 116 to the policies 132 stored at the virtual network function and virtual machine configuration design policy module 118. It should be understood that this example is illustrative and therefore should not be construed as being limiting in any way.

The flow can proceed from the virtual network function and virtual machine configuration design policy module 118 to the physical resource management module 112 of the policy management system 106. The physical resource management module 112 can identify available hardware resources, and apply the policies 132 to generate a hardware allocation plan for the available hardware. The hardware allocation plan can accommodate various redundancy schemes such as intra-site redundancy, inter-site redundancy, and/or geo-redundancy. The physical resource management module 112 also can create a hardware de-allocation plan, in some embodiments. The physical resource management module 112 of the policy management system 106 can allocate hardware to support the service, de-allocate hardware no longer need to support relocated services (if desired), and deploy the virtual network functions 124 and/or virtual machines 126 to the hardware that was allocated to effectively create the service. Additional details of the relocation process are illustrated and described in more detail below. As such, the above example should not be construed as being limiting in any way.

FIGS. 1A-1C illustrate one computing device 102, one network 104, one policy management system 106, one site 120, and two server computers 122. It should be understood, however, that various implementations of the operating environment 100 can include zero, one, or more than one computing device 102; zero, one, or more than one network 104; zero, one, or more than one policy management system 106; zero, one, or more than one site 120; and/or zero, one, two, or more than two server computers 122. As such, the illustrated embodiments should be understood as being illustrative, and should not be construed as being limiting in any way.

Figure 2:
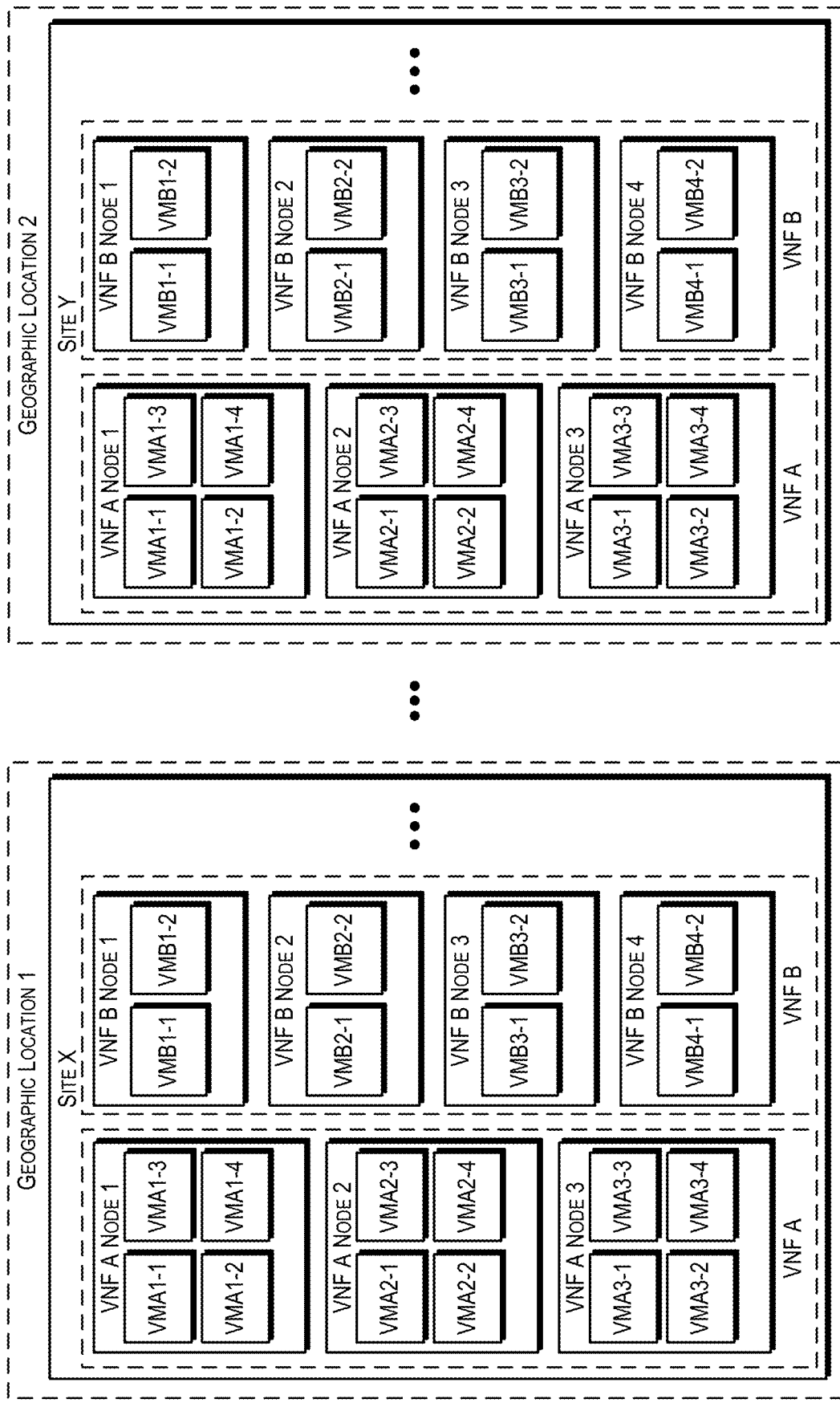
FIG. 2 schematically illustrates various aspects of virtual machine and virtual network function redundancy, according to some embodiments of the concepts and technologies described herein.

Turning now to FIG. 2, additional aspects of the concepts and technologies described herein for providing a network virtualization policy management system such as the policy management system 106 will be described, according to some illustrative embodiments. In particular, FIG. 2 schematically illustrates various aspects of virtual machine and virtual network function redundancy, according to some embodiments of the concepts and technologies described herein. It should be understood that the illustrated example is illustrative of the concepts and technologies described herein and therefore should not be construed as being limiting in any way.

Prior to describing FIG. 2 in detail, various aspects of redundancy in accordance with the concepts and technologies described herein will be explained. The concepts and technologies described herein can be used to maintain three layers of redundancy for a site 120 within a service region. In particular, redundancy for virtual machine replication policy can include intra-virtual network function redundancy, intra-site redundancy, and inter-site redundancy (also referred to herein as geographical redundancy). Each of these types of redundancy is addressed below.

With regard to intra-virtual network function redundancy, a virtual network function 124 can consist of multiple application virtual machines 126 that can be specialized for various particular responsibilities. These virtual machines 126 can work together to form a single virtual network function entity (also referred to herein as a "node"). For mission critical virtual network function nodes, a general rule can be to require no single point of failure. As such, virtual machines 126 within a mission critical virtual network function node can be implemented with internally redundant virtual machines 126 that can act to provide failover capability within the virtual network function node, which can be transparent to external peers. It should be understood that this example is illustrative and therefore should not be construed as being limiting in any way.

With regard to intra-site redundancy, when deploying a mission critical virtual network function 124 within a geographical site, it may be required to deploy redundant virtual network function nodes in the site such that the network function can be maintained when a part of the site experiences one or more fault events. The fault event could include a host server failure, a transport network malfunction (e.g., router or switch failure) that isolate a set of host servers, or other types of failures. The goal of intra-site redundancy as illustrated and described herein is to maintain the virtual network function 124 capability within the site as much as possible when a partial failure occurs in the site. Thus, embodiments of the concepts and technologies described herein use intra-site redundancy to establish two or more virtual network function nodes for the same network function in a site 120 so that when one virtual network function node is not responding, other virtual network function nodes can continue to provide requested services.

With regard to inter-site redundancy (also referred to herein as geographical redundancy), in order for a service to be able to survive a catastrophic event, such as earthquakes, catastrophic events, hurricanes, regional power failures, or the like, a network service platform may be deployed with geographical redundancy. In some embodiments of the concepts and technologies described herein, virtual network functions 124 in one physical site 120 can be backed up by the same virtual network functions 124 at other backup sites 120. Thus, when a site 120 is completely out of service, virtual network functions 124 at the backup site 120 can be able to provide the service.

The concepts and technologies described herein can employ various classes of redundancy configurations. According to various embodiments of the concepts and technologies described herein, 1+1 redundancy and N+k redundancy can be the most common configurations employed by the concepts and technologies described herein for intra-virtual network function redundancy, intra-site redundancy, and inter-site redundancy. Each of these configurations is described in additional detail below.

In a 1+1 redundancy configuration, a virtual network function 124 instance can be backed up by another virtual network function 124. In the case of an intra-virtual network function redundancy, a virtual machine 126 within a virtual network function node can be configured to be backed up by another virtual machine 126 within the same virtual network function node. In the case of an intra-site redundancy configuration, a virtual network function node can be backed up by another virtual network function node within the same site. In the case of an inter-site redundancy configuration, virtual network functions in one site can be backed up by a same set of virtual network functions 124 in another site. It should be understood that these examples are illustrative and therefore should not be construed as being limiting in any way.

In an N+k redundancy configuration, a service capability that requires N instances of a virtual network function 124 can be supported by N+k instances of the same virtual network functions 124. As such, this group of virtual network function 124 instances can survive failures of k instances without degradation of service quality. In the case of an intra-virtual network function redundancy, N+k virtual machines within a virtual network function node can provide service capability that normally requires only N virtual machines 126. In the case of an intra-site redundancy configuration, N+k virtual network function nodes within the same site can provide service capability that normally requires only N virtual network function nodes. In the case of an inter-site redundancy configuration, virtual network function in N+k sites can provide a network service that can survive total failure of k sites. It should be understood that these examples are illustrative and therefore should not be construed as being limiting in any way.

The concepts and technologies described herein also can use various failover implementations for any of the redundancy configurations described above. The following are the most common failover implementations employed by the concepts and technologies described herein. In an active with "cold" standby failover implementation, the redundant virtual network functions 124 (or virtual machines 126) can remain disabled or inactive. The virtual network functions 124 or virtual machines 126 can be activated and/or enabled only when active counterparts become unavailable. Activation of the standby redundant virtual network functions 124 or virtual machines 126 can be achieved either automatically or manually and can depend on specific implementations. In an active with "warm or hot" standby failover implementation, the redundant virtual network functions 124 (or virtual machines 126) can be enabled but may not process service requests. The standby virtual network functions 124 or virtual machines 126 may receive replication of service processing state information or have access to data stores of processing state information. In an active/active load sharing failover implementation, all virtual network functions 124 or virtual machines 126 in a redundancy group can be fully enabled and can actively process service requests in a load sharing fashion. The virtual network functions 124 and virtual machines 126 can share service processing state information either via real-time data replication and/or a common data store for such state information. It should be understood that these examples are illustrative and therefore should not be construed as being limiting in any way.

As shown in FIG. 2, two sites (Site X and Site Y) can be provided. Of course, any number of sites can be provided, so the illustrated embodiment should not be construed as being limiting in any way. In some embodiments, Site Y can be substantially similar, or even identical, to Site X. Site X and Site Y, however, can be located at two different geographic locations (Geographic Location 1 and Geographic Location 2). This approach to redundancy can be referred to herein as "geo-redundancy," and can be used to protect the functionality of the sites in the event of a catastrophic failure of one of the sites. Such a catastrophic failure can occur, for example, due to a natural disaster, an act of war, equipment failures, combinations thereof, or the like. It should be understood that this example is illustrative and therefore should not be construed as being limiting in any way.

Within each site, there can be two or more redundant virtual network functions (labeled "VNFs" in FIG. 2). Thus, the virtual network functions shown in FIG. 2 can operate as two independent virtual network functions. By providing at least one redundant virtual network function at a site level, the concepts and technologies described herein can be used to reduce a possibility of site-level failover in the event that a virtual network function malfunctions. In some embodiments, the multiple redundant virtual network function nodes can be provided for each virtual network function. It should be understood that this example is illustrative and therefore should not be construed as being limiting in any way.

Further redundancy can be provided within a virtual network function node. In particular, application functions associated with a particular machine of a virtual network function can be provided to increase a fault tolerance of the functional node. In some embodiments, the virtual machines of the virtual network function node can be deployed using a 1+1 redundancy scheme, an n+1 redundancy scheme, and/or an n+k redundancy scheme, wherein n can correspond to a number of instances of the virtual machines that are needed, and k can correspond to a number of failures the virtual network function should be configured to survive. For example, if a particular virtual network function requires three virtual machines to provide a particular function and should be designed to survive at least three failures, the n+k redundancy rules would result in the creation of six virtual machines (3+3=6) for the particular function. It should be understood that this example is illustrative and therefore should not be construed as being limiting in any way.

With reference to FIG. 2, it can be appreciated that the virtual network function nodes of the virtual network function A of Site X can be deployed using an n+2 redundancy scheme, and that the virtual machines of the virtual network function A of Site X can be deployed using an n+3 redundancy scheme. Similarly, the virtual network function nodes of the virtual network function B of Site X can be deployed using an n+3 redundancy scheme, and the virtual machines of the virtual network function B of Site X can be deployed using a 1+1 redundancy scheme. Site Y can be deployed using the same schemes, though this is not necessarily the case. It should be understood that this example is illustrative and therefore should not be construed as being limiting in any way.

Figure 3:
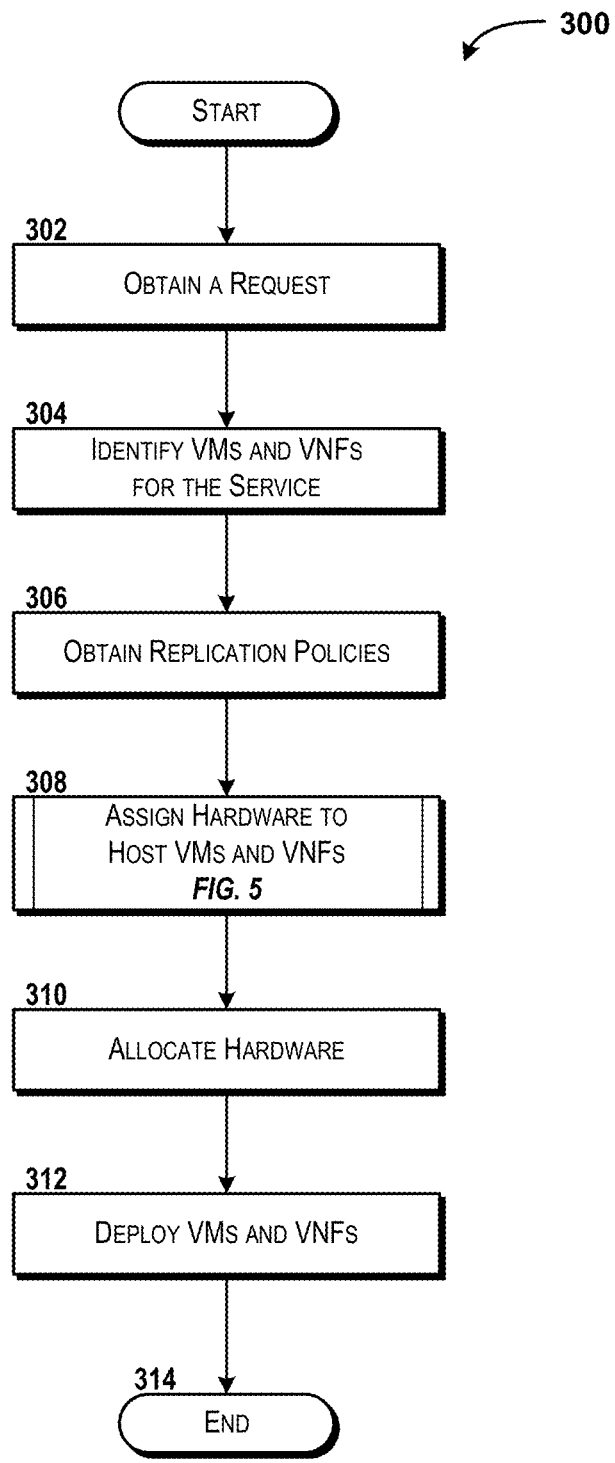
FIG. 3 is a flow diagram showing aspects of a method for replicating virtual machines for planned events, according to an illustrative embodiment of the concepts and technologies described herein.

Turning now to FIG. 3, aspects of a method 300 for replicating virtual machines for planned events will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the policy management system 106 to perform one or more operations and/or causing the processor to direct other components of the computing system or device to perform one or more of the operations.

For purposes of illustrating and describing the concepts of the present disclosure, the methods disclosed herein are described as being performed by the policy management system 106 via execution of one or more software modules such as, for example, the operation policy module 110, the physical resource management module 112, the virtual machine replication management module 114, the virtual machine relocation management module 116, and/or the virtual network function and virtual machine configuration design policy module 118. It should be understood that additional and/or alternative devices and/or network nodes can provide the functionality described herein via execution of one or more modules, applications, and/or other software including, but not limited to, the above-listed modules. Thus, the illustrated embodiments are illustrative, and should not be viewed as being limiting in any way.

The method 300 begins at operation 302. At operation 302, the policy management system 106 can obtain a request 108. In some other embodiments, the policy management system 106 can detect a planned event instead of, or in addition to, obtaining the request 108. The request 108 can be transmitted to and/or received by the policy management system 106, in some embodiments. The embodiment of a request 108 is described for purposes of illustrating and describing the concepts and technologies described herein, but should not be construed as being limiting in any way.

According to various embodiments, the request 108 received in operation 302 can correspond to an order request relating to a service. According to various embodiments, the request 108 can be received from a network operator, a network engineer, a business unit or operations unit, a user or consumer, or other entity that can access the policy management system 106. In some embodiments, the policy management system 106 can be accessed via a web portal, or the like, which may be accessible to the computing device 102 via a web browser. It should be understood that this example is illustrative and therefore should not be construed as being limiting in any way.

From operation 302, the method 300 proceeds to operation 304. At operation 304, the policy management system 106 can identify virtual network functions 124 and/or virtual machines 126 associated with the service requested by way of the request 108 received in operation 302. According to various embodiments, the policy management system 106 can analyze the request 108 received in operation 302 and determine, based upon this analysis, what virtual network functions 124 and/or virtual machines 126 will be used to support the service.

For example, if the request 108 corresponds to a request for a voice over Internet protocol ("VoIP") service, the policy management system 106 can identify various virtual network functions 124 and/or virtual machines 126 that can be used to support VoIP services. In some embodiments, this information can be stored in one or more design templates or the like, and can be indexed and/or catalogued based upon a description of the service, an entity associated with the request 108, a customer identified in the request 108, combinations thereof, or the like.

Thus, in this example, the policy management system 106 may identify the virtual machines 126 as corresponding to one or more of a router, an IP multimedia subsystem ("IMS"), a signaling device for generating session initiation protocol ("SIP") messages or the like, network transport, other devices, or the like. Based upon this identification, the policy management system 106 can generate a list or other data structure that can represent the virtual network functions 124 and/or virtual machines 126 that will be used or consumed by the service. It should be understood that this example is illustrative and therefore should not be construed as being limiting in any way.

From operation 304, the method 300 proceeds to operation 306. At operation 306, the policy management system 106 can obtain replication policies such as the policies 132 illustrated and described herein. The replication policies can include various policies 132 for selecting and allocating hardware resources; configuration design policies to define virtual machines 126 to provide a particular virtual network function 124; assignment policies that can define assignment rules for assigning virtual machines 126 to virtual network function nodes; placement policies to establish affinity and anti-affinity rules for placement of virtual machines 126; orchestration policies that can designate particular hosts or other hardware as being available or unavailable for particular virtual network functions 124 and/or virtual network function nodes; redundancy policies for specifying how and where to create redundant virtual network functions 124 and/or virtual machines 126; physical resources assignment policies that can define arrangement of virtual machines 126 of a virtual network function node to hardware; failover implementations to specify how redundant virtual network functions 124 and/or virtual machines 126 provide redundancy; virtual machine replication policies that can define how virtual network functions 124 and/or virtual machines 126 can be cloned; operational policy that can define how or when intervention by personnel may be ordered; combinations thereof; or the like.

The configuration design policies can define virtual machines 126 that can provide a particular virtual network function 124. Thus, the configuration design policies can define a particular set of hardware for providing particular virtual network functions 124 and/or virtual machines 126 based upon the hardware performance and/or configuration. The assignment policies can define assignment rules for assigning virtual machines 126 to virtual network function nodes. Thus, the assignment policies can define, for example, that for a particular virtual network function 124 such as "messaging," that particular virtual machines 126 such as virtual machine 1, virtual machine 2, and virtual machine 3 should be created. It should be understood that this example is illustrative and therefore should not be construed as being limiting in any way.

The placement policies can establish affinity and anti-affinity rules for placement of virtual machines 126. Thus, the placement policies can govern how virtual network functions 124 and/or virtual machines 126 can be located with respect to one another and/or how the virtual network functions 124 and/or virtual machines 126 should be located remote from one another based upon various affinity or anti-affinity rules. The orchestration policies can designate particular hosts or other hardware as being available or unavailable for particular virtual network functions 124 and/or virtual network function nodes. Thus, for example, the orchestration policies may specify that a particular server computer 122 is not available for any function corresponding to hosting video calls. Such a policy may be based, for example, upon geographic location, local or national laws or regulations, bandwidth demands, hardware capabilities, other considerations, or the like.

The redundancy policies can specify how and where to create redundant virtual network functions 124 and/or virtual machines 126. Various redundancy schemes are illustrated and described herein. Thus, the redundancy policies can specify 1+1 redundancy, n+1 redundancy, n+k redundancy, or other redundancy schemes. The redundancy policies also can specify various multi-scheme redundancy profiles.

In some embodiments, the redundancy policies can specify a three-layer redundancy profile for services. The three layers can include an inter-site level, also known as geo-redundancy; an intra-site level; and an internal level. The inter-site level can specify that each virtual network function 124 be replicated by at least one (if 1+1) or other number of (e.g., n+1, n+k) redundant virtual network function(s) 124 located at a different geographic location. The inter-site redundancy can be provided or required to avoid failure of a virtual network function 124 in the event of a power failure, natural disaster, or other catastrophic event at one geographic location.

The intra-site level of redundancy can be used to provide that at least two independent virtual network function nodes per virtual network function 124 should be located at a site when possible to minimize the need/frequency of a failover (to another site or location). The internal redundancy can be used to provide that within a virtual network function node, a fault tolerance of a functional node should be maximized. Thus, the internal redundancy can effect creation of multiple redundant virtual machines 126 within a particular virtual network function 124 or virtual network function node.

The physical resources assignment policies can define arrangement of virtual machines 126 of a virtual network function node to hardware. According to various embodiments of the concepts and technologies described herein, the physical resources assignment policies can specify that virtual machines 126 of a particular virtual network function node should be arranged to hardware with the most available resources at a time of analysis. Other policies can specify that hardware that is closest (in terms of geographic location) to other hardware being used for the service should be used. Other policies can define assignment in terms of latency, utilization, historical utilization, anticipated traffic, combinations thereof, or the like.

The failover implementations can specify how redundant virtual network functions 124 and/or virtual machines 126 can provide redundancy. Thus, the failover implementations can specify that a virtual network functions 124 and/or virtual machines 126 are active with cold standby, active with hot standby, or active with active load sharing. In active with cold standby, redundant virtual network functions 124 and/or virtual machines 126 can remain disabled or inactive until or unless the active/enabled counterparts fail or otherwise become unavailable.

In active with hot standby, redundant virtual network functions 124 and/or virtual machines 126 can remain enabled but may not process service requests. The virtual network functions 124 and/or virtual machines 126 can receive state information from a data store or as replicated from the active virtual network functions 124 and/or virtual machines 126. In active with active load sharing, redundant virtual network functions 124 and/or virtual machines 126 can be active and can process service requests using load sharing. The sharing virtual network functions 124 and/or virtual machines 126 can share state information with one another using a data store and/or replication.

The virtual machine replication policies can define how virtual network functions 124 and/or virtual machines 126 can be cloned. Thus, the virtual machine replication policies can specify if all aspects (e.g., utilization, failover implementations, redundancy, etc.) of the virtual network functions 124 and/or virtual machines 126 are cloned, or if only portions of the virtual network functions 124 and/or virtual machines 126 (e.g., the functions) are cloned, among other things. The operational policy can define how or when intervention by personnel may be ordered. Thus, the operational policy may define triggers or events that, if detected, can involve personnel in resolving any issues.

From operation 306, the method 300 proceeds to operation 308. At operation 308, the policy management system 106 can assign hardware to host the virtual network functions 124 and/or virtual machines 126 identified in operation 304. Additional aspects of assigning the hardware to host the virtual network functions 124 and/or virtual machines 126 will be illustrated and described below with reference to FIGS. 5 and 7-8. Briefly, the policy management system 106 can identify available hardware, apply the replication policies, and output a hardware allocation plan.

From operation 308, the method 300 proceeds to operation 310. At operation 310, the policy management system 106 can allocate hardware for the service. In various embodiments, the policy management system 106 can instruct various network entities to allocate the hardware determined in operation 308 for use. Although not shown in FIG. 3, the policy management system 106 can wait until the hardware is allocated before proceeding with execution of the method 300, in some embodiments, though this is not necessarily the case.

From operation 310, the method 300 proceeds to operation 312. In operation 312, the policy management system 106 can deploy virtual network functions 124 and/or virtual machines 126 to the hardware allocated in operation 310. In some embodiments, the policy management system 106 can instruct a hypervisor or other device to deploy the virtual network functions 124 and/or virtual machines 126. Thus, the policy management system 106 may deploy the virtual network functions 124 and/or virtual machines 126 or may instruct other devices or entities to deploy the virtual machines 126 and/or the virtual network functions 124. It should be understood that this example is illustrative and therefore should not be construed as being limiting in any way.

As such, it can be appreciated that performance of the method 300 can result in allocation of hardware and deployment of virtual network functions 124 and/or virtual machines 126 to provide a service. From operation 312, the method 300 proceeds to operation 314. The method 300 ends at operation 314.

Figure 4:
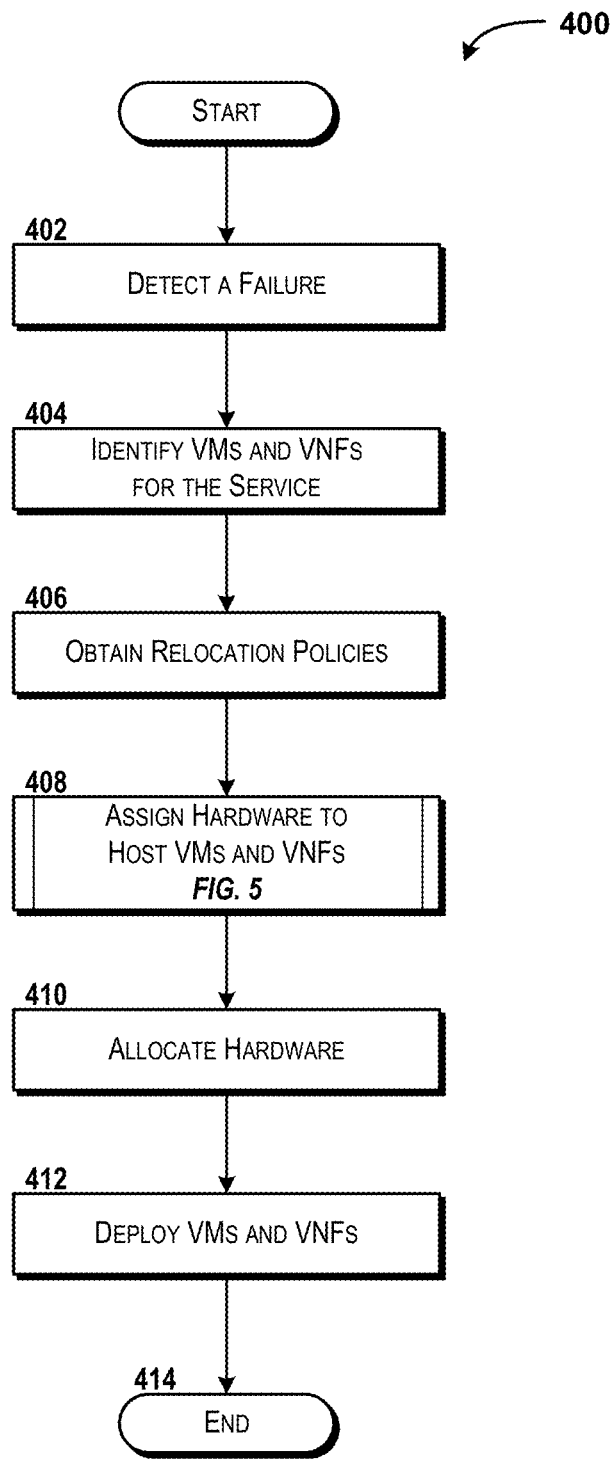
FIG. 4 is a flow diagram showing aspects of a method for relocating virtual machines for unplanned events, according to an illustrative embodiment of the concepts and technologies described herein.

Turning now to FIG. 4, aspects of a method 400 for relocating virtual machines for unplanned events will be described in detail, according to an illustrative embodiment. The method 400 begins at operation 402. At operation 402, the policy management system 106 can detect a failure or other event. In some embodiments, the policy management system 106 can detect the failure by receiving failure data 130.

According to various embodiments, the failure data 130 received in operation 402 can correspond to an alarm, an alert, or other information that can inform the policy management system 106 of a failure. The failure can include, but is not limited to, a hardware failure such as a failure of a server computer, network transport, routing, and/or other hardware; software failures such as failure of a virtual machine 126 and/or virtual network function 124 failures; loss of connectivity; and/or other types of failures that may impact a service. In the embodiment shown in FIG. 1C, the failure data 130 is illustrated as being transmitted or provided to the policy management system 106 from the network 104. It should be understood, however, that network monitors, the site 120, controllers, or other entities can detect failures and/or generate the failure data 130. Furthermore, as noted above, the policy management system 106 may be configured to monitor the site 120 and/or other hardware resources, and as such, the failure can be detected by the policy management system 106.

From operation 402, the method 400 proceeds to operation 404. At operation 404, the policy management system 106 can identify virtual network functions 124 and/or virtual machines 126 associated with the service that has been impacted by the failure. Thus, the policy management system 106 can, by way of identifying the virtual network functions 124 and/or virtual machines 126, plan for a relocation or other type of deployment to address the failure. The policy management system 106 can analyze the service and determine what virtual network functions 124 and/or virtual machines 126 will be used to support the service. The policy management system 106 can generate a list or other data that can represent the virtual network functions 124 and/or virtual machines 126 that were used or consumed by the service prior to the failure. It should be understood that this example is illustrative and therefore should not be construed as being limiting in any way.

From operation 404, the method 400 proceeds to operation 406. At operation 406, the policy management system 106 can obtain relocation policies such as the policies 132 illustrated and described herein. The relocation policies can be substantially similar (or even identical) to the replication policies described above with reference to the method 300, though the virtual machine replication policies can be replaced with virtual machine relocation policies and the failover implementations may be unnecessary (since a deployed service may have a previously-defined failover implementation).

The virtual machine relocation policies can define how virtual network functions 124 and/or virtual machines 126 are recovered after a failure from available resources. In some embodiments, the virtual machine relocation policies can define how virtual machines 126 may be moved to new servers and/or how physical servers may be recovered.

From operation 406, the method 400 proceeds to operation 408. At operation 408, the policy management system 106 can assign hardware to host the virtual network functions 124 and/or virtual machines 126 identified in operation 404. Additional aspects of assigning the hardware to host the virtual network functions 124 and/or virtual machines 126 will be illustrated and described below with reference to FIGS. 6-8.

From operation 408, the method 400 proceeds to operation 410. At operation 410, the policy management system 106 can allocate hardware for the service. It can be appreciated that in the case of relocation, the hardware allocated in operation 410 can be new hardware (relative to the hardware hosting the service when the failure was detected) and/or scaled hardware. In various embodiments, the policy management system 106 can instruct various network entities to allocate the hardware determined in operation 408 for use. As mentioned above, the policy management system 106 can wait until the hardware is allocated before proceeding with execution of the method 400, though this is not required.

From operation 410, the method 400 proceeds to operation 412. In operation 412, the policy management system 106 can deploy virtual network functions 124 and/or virtual machines 126 to the hardware allocated in operation 410. In some embodiments, the policy management system 106 can instruct a hypervisor or other device to deploy the virtual network functions 124 and/or virtual machines 126. Thus, the policy management system 106 may deploy the virtual network functions 124 and/or virtual machines 126 or may instruct other devices or entities to deploy the virtual machines 126 and/or the virtual network functions 124. In the case of a failure, the deployment of the virtual network functions 124 and/or virtual machines 126 can be accompanied by tearing down or terminating virtual network functions 124 and/or virtual machines 126 at other hardware, thereby effecting the relocation of the virtual machines 126 and/or virtual network functions 124. It should be understood that this example is illustrative and therefore should not be construed as being limiting in any way.

As such, it can be appreciated that performance of the method 400 can result in allocation of hardware and deployment of virtual network functions 124 and/or virtual machines 126 to relocate a service that has failed to new hardware and/or new virtual resources. It should be understood that the de-allocation of hardware and/or the release of hardware resources also may result from the method 400. From operation 412, the method 400 proceeds to operation 414. The method 400 ends at operation 414.

Figure 5:
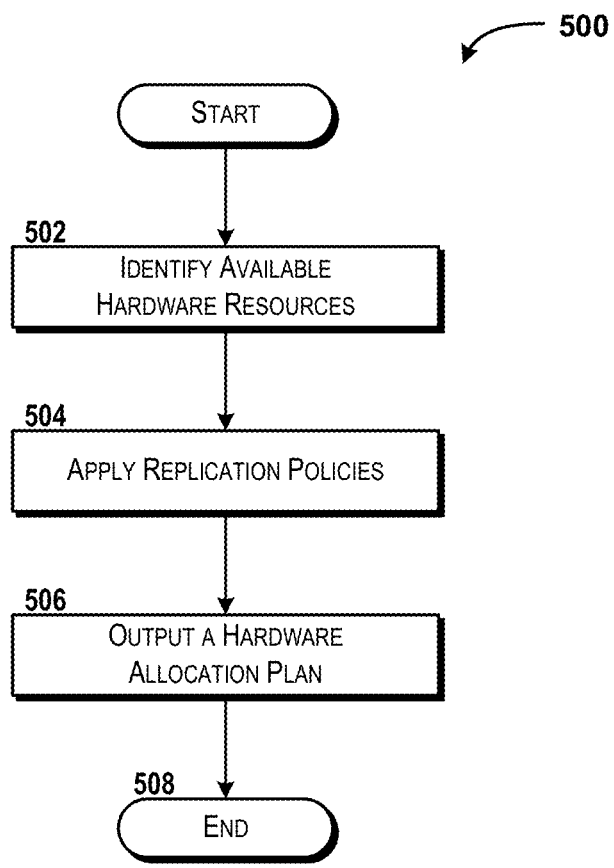
FIG. 5 is a flow diagram showing aspects of a method for assigning hardware for replication processes, according to an illustrative embodiment of the concepts and technologies described herein.

Turning now to FIG. 5, aspects of a method 500 for assigning hardware for replication processes will be described in detail, according to an illustrative embodiment. The method 500 begins at operation 502. At operation 502, the policy management system 106 can identify available hardware resources. As explained above, the policy management system 106 can monitor various types and/or instances of hardware such as, for example, the site 120 and/or server computers 122 located at or in proximity to the site 120. The policy management system 106 also can receive monitoring information or data from various hardware or software elements such as, for example, network monitors, system monitors, resource monitors, combinations thereof, or the like.

In some other embodiments, the policy management system 106 can monitor one or more services and, based upon a knowledge of hardware and/or software associated with those services, determine an expected availability of hardware. In yet other embodiments, the policy management system 106 can execute a real or virtual application for monitoring various hardware resources. As such, the policy management system 106 can be configured to monitor hardware resources and determine, based upon the monitoring, what hardware is or is not available at any time. Because hardware availability can be determined in additional and/or alternative ways, it should be understood that these examples are illustrative and therefore should not be construed as being limiting in any way.

From operation 502, the method 500 proceeds to operation 504. At operation 504, the policy management system 106 can apply the replication policies. In applying the policies 132 in operation 504, the policy management system 106 can use the available hardware resources that are available as one input, and the virtual network functions 124 and the virtual machines 126 that are used to provide the service as a second input. Thus, the policy management system 106 can apply the policies 132, which can be directed graphs, algorithms, and/or matrices of imposed requirements, to these inputs to map the service features as captured by the virtual network functions 124 and/or the virtual machines 126 to the hardware resources that are available to support the service.

Thus, the configuration design policies can be applied to identify the hardware resources that are to be used to provide the service. As noted above, the hardware can be identified based upon requirements of the service and capabilities of the hardware. For example, a messaging application can be mapped to a server that has the capability to communicate with other hardware and/or to support such communications. It should be understood that this example is illustrative and therefore should not be construed as being limiting in any way.

The placement policies can be used to apply affinity and anti-affinity rules for placement of virtual machines 126. Thus, the placement policies can be used to rule out certain configurations of the hardware resources where the hardware may be located at the same rack, POD, or other division of the site 120. Similarly, the placement policies may urge the policy management system 106 to select a configuration based upon the affinity rules such as a preference for two or more hardware resources to host two or more virtual network functions 124 and/or virtual machines 126 of a service. It should be understood that this example is illustrative and therefore should not be construed as being limiting in any way.

The orchestration policies can designate particular hosts or other hardware as being available or unavailable for particular virtual network functions 124 and/or virtual network function nodes. As such, the orchestration policies may dictate that although a particular hardware resource would serve the purpose of a particular virtual network function 124 and/or virtual machine 126, the hardware resource may be excluded or disallowed for some reason. The reason can include, for example, pricing plans, location considerations, bandwidth costs, labor and/or energy costs, combinations thereof, or the like.

The redundancy policies can specify how and where to create redundant virtual network functions 124 and/or virtual machines 126. Thus, the hardware can be identified based upon the capacity of the hardware resources to satisfy (or the failure to satisfy) various redundancy requirements specified by the policies 132. As noted above, the redundancy policies can impose a three-layer redundancy profile for services. As such, the redundancy policies can rule out some hardware resources that may be unable to satisfy the three-layer redundancy and/or rule-in some hardware that can support the redundancy. It should be understood that these examples are illustrative and therefore should not be construed as being limiting in any way.

The physical resources assignment policies can specify that virtual machines 126 of a particular virtual network function node should be arranged to hardware with the most available resources at a time of analysis. Thus, the policy management system 106 can consider utilization and assign hardware resources based upon availability at a current time. The failover implementations can be specified by the policies to either hot, cold, or active with load sharing. Thus, the policy management system 106 can apply the failover implementations to the hardware resources to select resources that can support the selected failover implementation.

The virtual machine replication policies can define how virtual network functions 124 and/or virtual machines 126 can be cloned. Thus, the virtual machine replication policies can be applied to determine what aspects of the virtual network functions 124 and/or the virtual machines 126 will be cloned, and select only the hardware that will support the designated cloning approach. The operational policy that can define how or when intervention by personnel may be ordered.

From operation 504, the method 500 proceeds to operation 506. At operation 506, the policy management system 106 can output a hardware allocation plan. The hardware allocation plan can define how hardware is to be allocated to support the service and can be based upon the application of the policies 132 as discussed in operation 504. Thus, in operation 506, the policy management system 106 can output a set of hardware resources that can satisfy the policies 132 applied in operation 504.

Thus, briefly, the hardware allocation plan can define hardware resources that can be used to provide the service, that satisfy affinity and/or anti-affinity rules, that are not ruled out and/or that are ruled allowable for some reason, that can satisfy a specified redundancy scheme, that have the most available resources at a time of analysis, that can support a specified failover implementation, and that can support the cloned versions of the virtual network functions 124 and/or the virtual machines 126. It should be understood that this example is illustrative and therefore should not be construed as being limiting in any way.

Thus, by execution of the method 500, the policy management system 106 can output a set of hardware resources that can support the service and/or the virtual network functions 124 and/or the virtual machines 126 associated with the service. This information can be used for allocation of the hardware resources for a service and/or for deployment of the virtual network functions 124 and/or virtual machines 126 for the service. From operation 506, the method 500 proceeds to operation 508. The method 500 ends at operation 508.

Figure 6:
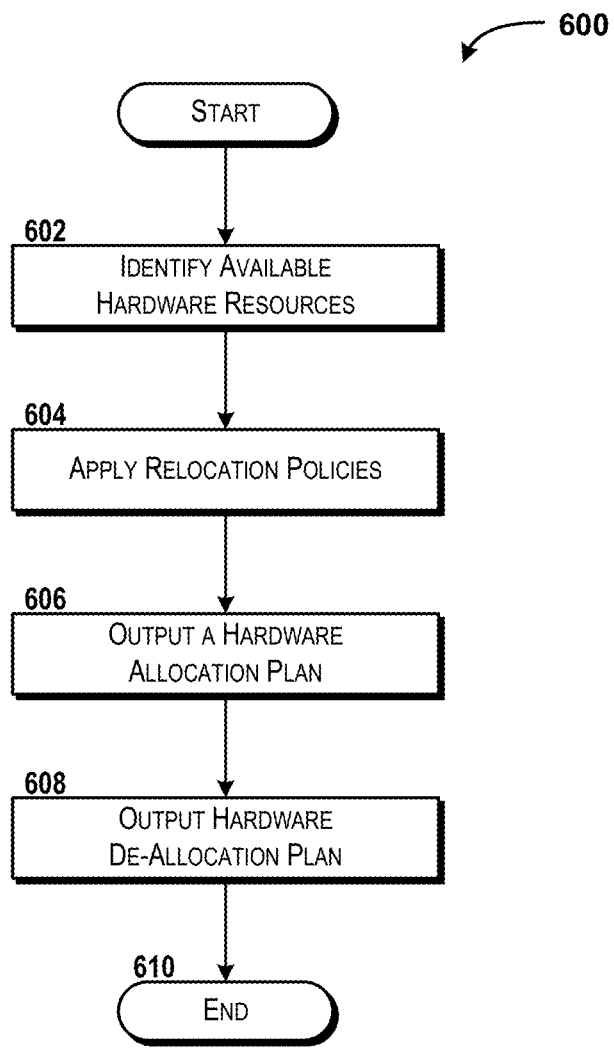
FIG. 6 is a flow diagram showing aspects of a method for assigning hardware for relocation processes, according to an illustrative embodiment of the concepts and technologies described herein.

Turning now to FIG. 6, aspects of a method 600 for assigning hardware for relocation processes will be described in detail, according to an illustrative embodiment. The method 600 begins at operation 602. At operation 602, the policy management system 106 can identify available hardware resources. As explained above, the policy management system 106 can monitor various types and/or instances of hardware such as, for example, the site 120 and/or server computers 122. The policy management system 106 also (or alternatively) can receive monitoring information or data and/or can base the determination of what resources are available based upon monitoring other sources and/or knowledge of how resources are consumed or used to provide those services. It should be understood that hardware availability can be determined in additional and/or alternative ways.

From operation 602, the method 600 proceeds to operation 604. At operation 604, the policy management system 106 can apply the relocation policies. As explained above with regard to the method 500, the policy management system 106 can use the available hardware resources and the service requirements (in terms of virtual network functions 124 and/or virtual machines 126) as inputs for the analysis. The policy management system 106 can apply the policies 132 to the available hardware and/or the service requirements to map the service features to the hardware resources that are available to support the service.

The application of the relocation policies can be completed to specify de-allocation of hardware resources (for moved hardware) and/or allocation of hardware resources, though this is not necessarily the case. It should be understood that the application of the relocation policies can be substantially similar, in some embodiments, to the application of the replication policies, though the failover implementation used may be the same as previously used and therefore may not be determined.

From operation 604, the method 600 proceeds to operation 606. At operation 606, the policy management system 106 can output a hardware allocation plan. The hardware allocation plan can define how hardware is to be allocated to support the service and can be based upon the application of the policies 132 as discussed in operation 604. Thus, in operation 606, the policy management system 106 can output a set of hardware resources that can satisfy the policies 132 applied in operation 604.

Thus, briefly, the hardware allocation plan can define hardware resources that can be used to provide the relocated service, that satisfy affinity and/or anti-affinity rules, that are not ruled out as being allowable and/or that are ruled allowable, that can satisfy a specified redundancy, that have the most available resources at analysis time, and that can support cloned versions of the virtual network functions 124 and/or the virtual machines 126 that previously failed. It should be understood that this example is illustrative and therefore should not be construed as being limiting in any way.

From operation 606, the method 600 proceeds to operation 608. In operation 608, the policy management system 106 can output a hardware de-allocation plan. The hardware de-allocation plan can specify what hardware resources are to be released based upon the relocation of the hardware resources and/or the hosted virtual network functions 124 and/or the virtual machines 126 from various hardware resources. Thus, the policy management system 106 can identify hardware resources that can be released and/or reused by application of the policies as illustrated and described herein.

Thus, by execution of the method 600, the policy management system 106 can output a set of hardware resources that can support the service and/or the virtual network functions 124 and/or the virtual machines 126 associated with the service, as well as outputting data indicating how hardware resources can be released. The output from the method 600 can be passed to the policy management system 106, and from the policy management system 106 to a hypervisor or other functionality for implementing the hardware allocation plan and/or the hardware de-allocation plan. From operation 608, the method 600 proceeds to operation 610. The method 600 ends at operation 610.

The above-described embodiments have discussed the policies 132 in general and specific terms. Some example embodiments of the policies 132 are now provided to enable a clearer understanding of the concepts and technologies described herein. It should be understood that these examples are illustrative of the various embodiments generally described herein, and as such, these examples should not be construed as being limiting in any way.

An example embodiment of redundancy policies can be specified for two or more types of redundancy. For example, for a virtual network function 124 that is configured with n+k redundancy among its virtual network function nodes, the following rules or policies can be applied. First, if a failure of a single application type virtual machine 126 is due to a failure of the host server, new incoming traffic can be distributed among the remaining working virtual machines 126 in the virtual network function nodes. Second, if a failure of single active I/O or MRFC type virtual machine 126 is due to a failure of the host server, a standby virtual machine 126 residing on a host in another availability zone can assume responsibility for the failed virtual machine. Availability zones are discussed in more detail below.

Third, if a failure of multiple application virtual machines 126 is due to a frame or POD failure, the policy can assume that about fifty percent of all virtual machines 126 in virtual network function node may fail at the same time. Fourth, if failure of an entire virtual network function node is due to a failure of multiple PODs or the entire site, the policy can define that since there is only one virtual network function node per site for these types of virtual network functions, the geo-redundant site virtual network function node(s) performing the failed virtual network function node function will take over. It should be understood that this example is illustrative and therefore should not be construed as being limiting in any way.

Similarly, for a virtual network function 124 that is configured with 1+1 redundancy among its virtual network function nodes, the following rules or policies can be applied. First, if a failure of a single active application type virtual machine 126 is due to a failure of the host server, a standby virtual machine 126 residing on a host in another availability zone can take over for the failed virtual machine 126. Similarly, the CFED or DFED can begin routing requests to the virtual machine 126 that took over for the failed virtual machine 126. Second, if a failure of single active FED type virtual machine 126 is due to a failure of the host server, the standby virtual machine 126 residing on a host in another availability zone can take over for the failed virtual machine 126.

Third, if a failure of a single active OAM type virtual machine 126 is due to a failure of the host server, the standby virtual machine 126 residing on a host in the other availability zone can take over for the failed virtual machine 126. Fourth, if a failure of multiple active virtual machines 126 is due to a frame or POD failure, it can be assumed that all active virtual machines 126 in a virtual network function node 124 failed at once in the same availability zone. Fifth, if a failure of an entire virtual network function node is due to a failure of multiple PODs or the entire site, the remaining virtual network function nodes in the site may assume responsibility for all traffic that would have been routed to the failed virtual network function node. In some other instances, a geo-redundant site virtual network function node(s) performing the function associated with the failed virtual network function node may assume responsibility. It should be understood that this example is illustrative and therefore should not be construed as being limiting in any way.

An example assignment policy for virtual network function nodes 124 can provide the following rules and/or policies. A virtual network function node composition policy can to provide virtual machine 126 assignment rules for establishing virtual network function nodes. First, a number of virtual network function nodes per site can be specified (e.g., 2 per site). Second, the number may be required to be compliant with the virtual network function node composition rules for each virtual network function 124, and as such, the specified number of virtual machines 126 by type may be required to be met. Third, virtual machine types may be assigned specific types designating allocated CPUs, RAM, and disk storage. Fourth, each virtual network function for a specific virtual network function may be required to should contain the same number of application virtual machines 126 to avoid a capacity imbalance and/or for other reasons.

It should be understood that this example is illustrative and therefore should not be construed as being limiting in any way.

A virtual machine placement policy can establish affinity and/or anti-affinity rules. For example, the rules or policies can specify that when assigning an n+k virtual machine 126 to a physical host, using a host in the availability zone that is most filled with the same type of virtual machines 126 for the same virtual network function node should be avoided. Similarly, if assigning the virtual machine 126 to a host in the same zone where the same type of virtual machines 126 for that virtual network function node are already assigned, the rules and policies may suggest that the virtual machine 126 should not be assigned to the same host where an existing virtual machine 126 of the same type in the same virtual network function node resides. Another rule or policy can specify that when establishing 1+1 redundant virtual machines 126 within a virtual network function node, virtual machines 126 should not be assigned to a physical host that is in the same availability zone where its redundant pair virtual machine 126 is already assigned. If no other option exists, the policy 132 may suggest that at least the virtual machine 126 should not be assigned to the same host as the paired virtual machine 126. An example orchestration policy can designate specific hosts (e.g., servers) as either being available or unavailable for assignment to virtual network function nodes for establishment, replacement, or augmentation of a virtual network function 124.

A physical resources assignment policy can provide the following rules or guidance. First, for 1+1 redundant pair virtual machines 126, the policy may dictate that such virtual machines 126 may not reside on the same physical host and/or may not reside on the same frame or in the same POD. Second, for n+k redundant virtual machines 126 within the same virtual network function node, the policy may dictate that the virtual machines 126 may not reside on the same physical host. Third, for n+k redundant virtual machines 126 within a virtual network function node, the policy may dictate that virtual machines 126 should be distributed among more than one POD. Fourth, the policy may help ensure that a statistically adequate number of spare virtual machine hosts are available to replace failed virtual machines 126, and that the proportion of spare to active hosts is uniform for all virtual machines 126. It should be understood that this example is illustrative and therefore should not be construed as being limiting in any way.

An example virtual network function and virtual machine configuration policy can include the following policies and/or rules. First, a virtual network function 124 can include a defined set of virtual machines 126 that can be located at a site and can work together to perform a specific virtualized network function 124. Second, a dimensioning template can include pre-configured and pre-tested virtual network function configuration parameters. The configuration policy also can dictate maintenance of three layers of redundancy for a core site within the service region including inter-site redundancy, intra-site level redundancy, and internal redundancy. A virtual machine assignment policy can encourage multiple virtual machines 126 to be allowed to be established on a single server/host, subject to virtual machine requirements and anti-affinity rules. It should be understood that this example is illustrative and therefore should not be construed as being limiting in any way.

As mentioned above, an example of availability zones is provided. A site may include two availability zones. Each availability site can include X racks and Y PODs assigned to each rack. In one embodiment, the sites include three racks per POD. The number of racks and servers per POD can vary. Each active and spare host (e.g., a server) may be required to be assigned to a zone. In some embodiments, the site may be maintained to ensure that there is generally a relatively equal number of active and spare hosts (e.g., servers) assigned to each zone based on virtual network function node and sparing requirements. Similarly, the site may be maintained to ensure that hosts (e.g., servers) mounted on a specific rack may not be split across zones. In some embodiments, the racks within a POD group may not be split across zones, and in some embodiments, there may be no layout requirement regarding what PODs are assigned to what zone. It should be understood that this example is illustrative and therefore should not be construed as being limiting in any way.

Figure 7:
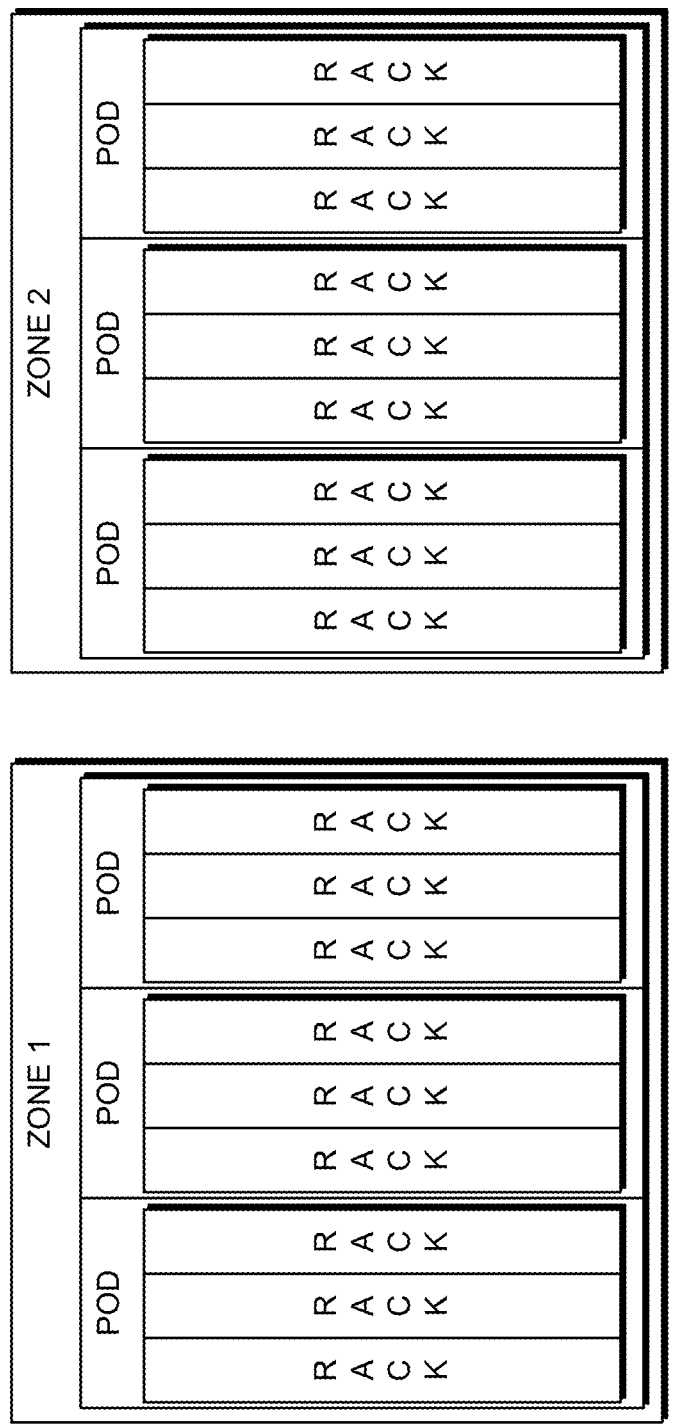
Figure 8:
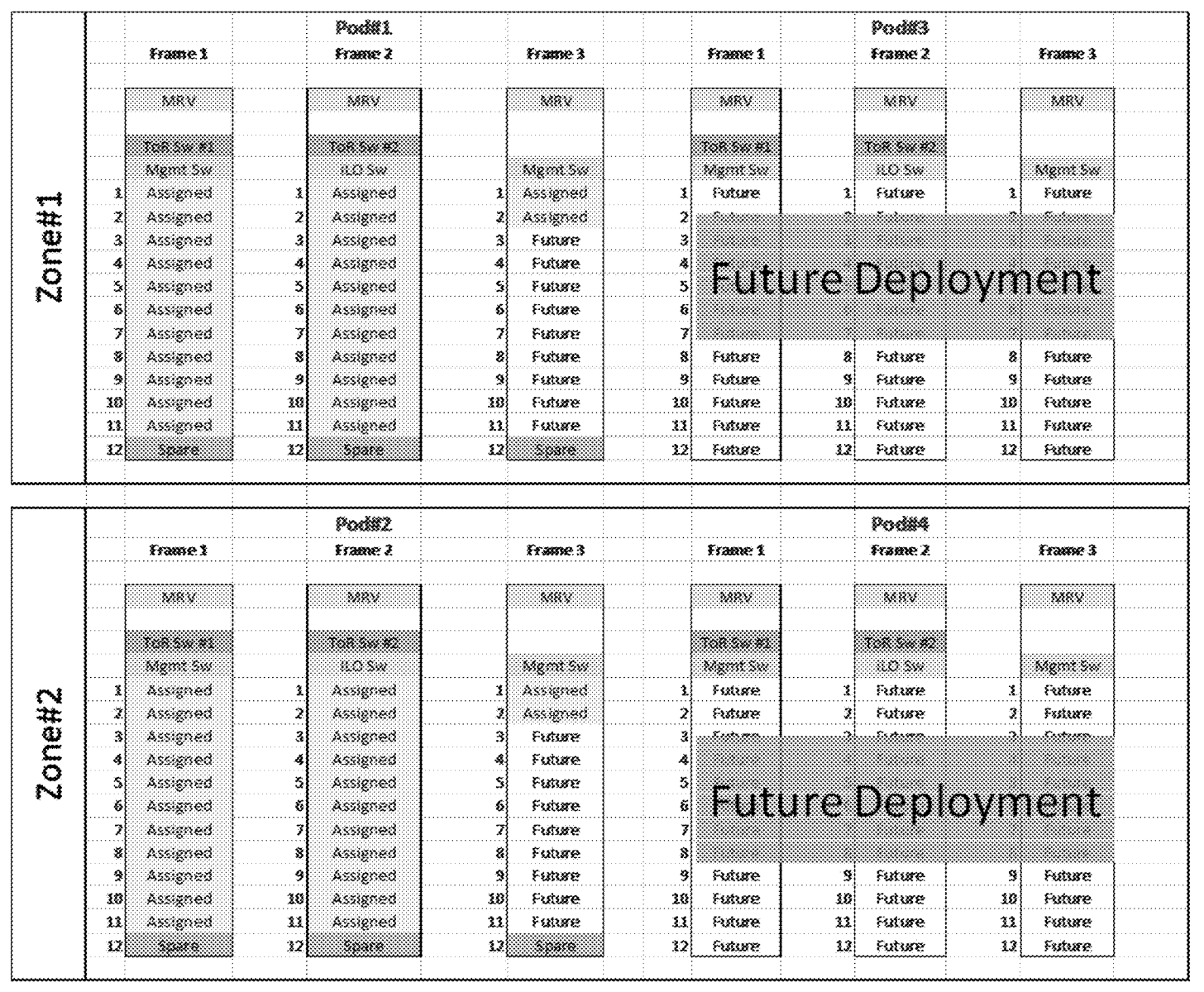

Turning now to FIGS. 7 and 8, additional aspects of the concepts and technologies described herein for a network virtualization policy management system will be illustrated and described in detail. According to various embodiments of the concepts and technologies described herein, a physical resources assignment policy can be used. The policy can rely upon various design principles. Some example design principles can include a first design principle to minimize any correlation factors for the servers (hosts) mounted on the same frame, a second design principle to minimize the impact of a single host failure, a third design principle to minimize the impact of a single frame failure, and a fourth design principle to minimize the impact of a POD (three rack/two top-of-rack switches) failure.

According to some embodiments, an assignment policy can include ensuring that 1+1 redundant pair virtual machines 126 must not reside on the same physical host and should not reside on the same frame or in the same POD. The assignment policy also can include ensuring that N+k redundant virtual machines 126 within the same virtual network function node must not reside on the same physical host. The assignment policy also can include ensuring that N+k redundant virtual machines 126 within a virtual network function node should be distributed between more than one POD. The assignment policy also can include ensuring that a statistically adequate number of spare virtual machine hosts are available to replace failed virtual machines 126 and that the proportion of spare to active hosts is uniform for all virtual machines 126. It should be understood that these examples are illustrative and therefore should not be construed as being limiting in any way.

In one example implementation of the above assignment policy, availability zones can be used to place virtual network functions 124 and virtual machines 126. Two example zones are shown in the example illustrated and described with reference to FIG. 7. As shown, two availability zones per site can have X racks and Y PODs assigned to each zone. In some contemplated embodiments of the concepts and technologies described herein, three racks per POD are used (as shown in FIG. 7), though the number of racks and servers per POD can vary. According to various embodiments of the concepts and technologies described herein, each active and spare host (server) must be assigned to a zone. The concepts and technologies described herein can ensure that there always are a relatively equal number of active and spare hosts (servers) assigned to each zone based on virtual network function node and sparing requirements. The concepts and technologies described herein also can ensure that hosts (servers) mounted on a specific rack are not split across zones. Furthermore, racks within a POD group also may not be split across zones according to various embodiments of the concepts and technologies described herein. There may be layout requirement regarding which PODs are assigned to which zone. It should be understood that this example is illustrative and therefore should not be construed as being limiting in any way. An example planned deployment is illustrated in FIG. 8. It should be understood that this example is illustrative and therefore should not be construed as being limiting in any way.

Figure 9:
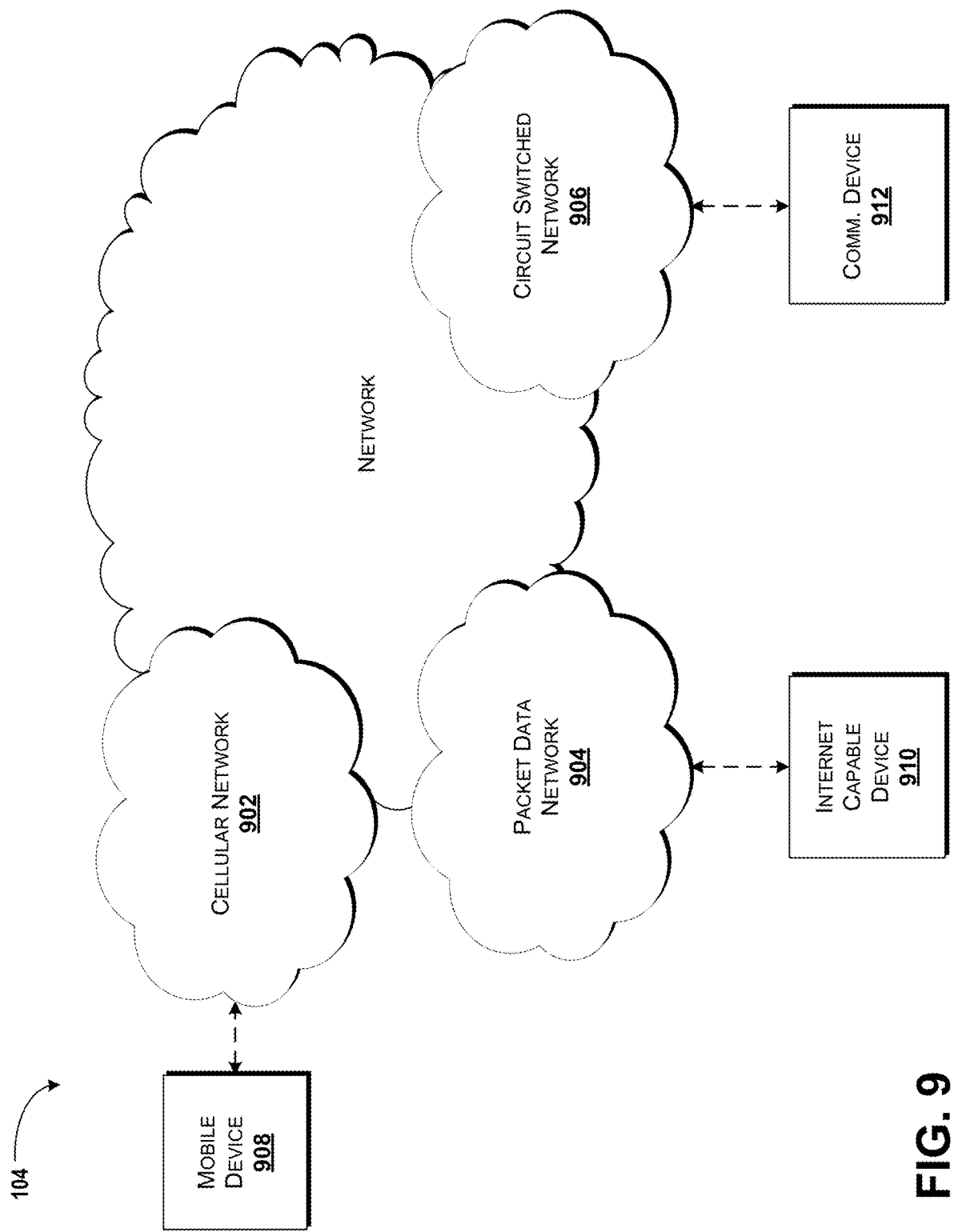
FIG. 9 schematically illustrates a network, according to an illustrative embodiment of the concepts and technologies described herein.

Turning now to FIG. 9, additional details of the network 104 are illustrated, according to an illustrative embodiment. The network 104 includes a cellular network 902, a packet data network 904, for example, the Internet, and a circuit switched network 906, for example, a publicly switched telephone network ("PSTN"). The cellular network 902 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 902 also includes radios and nodes for receiving and transmitting voice, data, and combinations thereof to and from radio transceivers, networks, the packet data network 904, and the circuit switched network 906.

A mobile communications device 908, such as, for example, a cellular telephone, a user equipment, a mobile terminal, a PDA, a laptop computer, a handheld computer, and combinations thereof, can be operatively connected to the cellular network 902. The cellular network 902 can be configured as a 2G GSM network and can provide data communications via GPRS and/or EDGE. Additionally, or alternatively, the cellular network 902 can be configured as a 3G UMTS network and can provide data communications via the HSPA protocol family, for example, HSDPA, EUL (also referred to as HSDPA), and HSPA+. The cellular network 902 also is compatible with 4G mobile communications standards as well as evolved and future mobile standards.

The packet data network 904 includes various devices, for example, servers, computers, databases, and other devices in communication with one another, as is generally known. The packet data network 904 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 904 includes or is in communication with the Internet. The circuit switched network 906 includes various hardware and software for providing circuit switched communications. The circuit switched network 906 may include, or may be, what is often referred to as a plain old telephone system (POTS). The functionality of a circuit switched network 906 or other circuit-switched network are generally known and will not be described herein in detail.

The illustrated cellular network 902 is shown in communication with the packet data network 904 and a circuit switched network 906, though it should be appreciated that this is not necessarily the case. One or more Internet-capable devices 910, for example, a PC, a laptop, a portable device, or another suitable device, can communicate with one or more cellular networks 902, and devices connected thereto, through the packet data network 904. It also should be appreciated that the Internet-capable device 910 can communicate with the packet data network 904 through the circuit switched network 906, the cellular network 902, and/or via other networks (not illustrated).

As illustrated, a communications device 912, for example, a telephone, facsimile machine, modem, computer, or the like, can be in communication with the circuit switched network 906, and therethrough to the packet data network 904 and/or the cellular network 902. It should be appreciated that the communications device 912 can be an Internet-capable device, and can be substantially similar to the Internet-capable device 910. In the specification, the network 104 is used to refer broadly to any combination of the networks 902, 904, 906. It should be appreciated that substantially all of the functionality described with reference to the network 104 can be performed by the cellular network 902, the packet data network 904, and/or the circuit switched network 906, alone or in combination with other networks, network elements, and the like.

Figure 10:
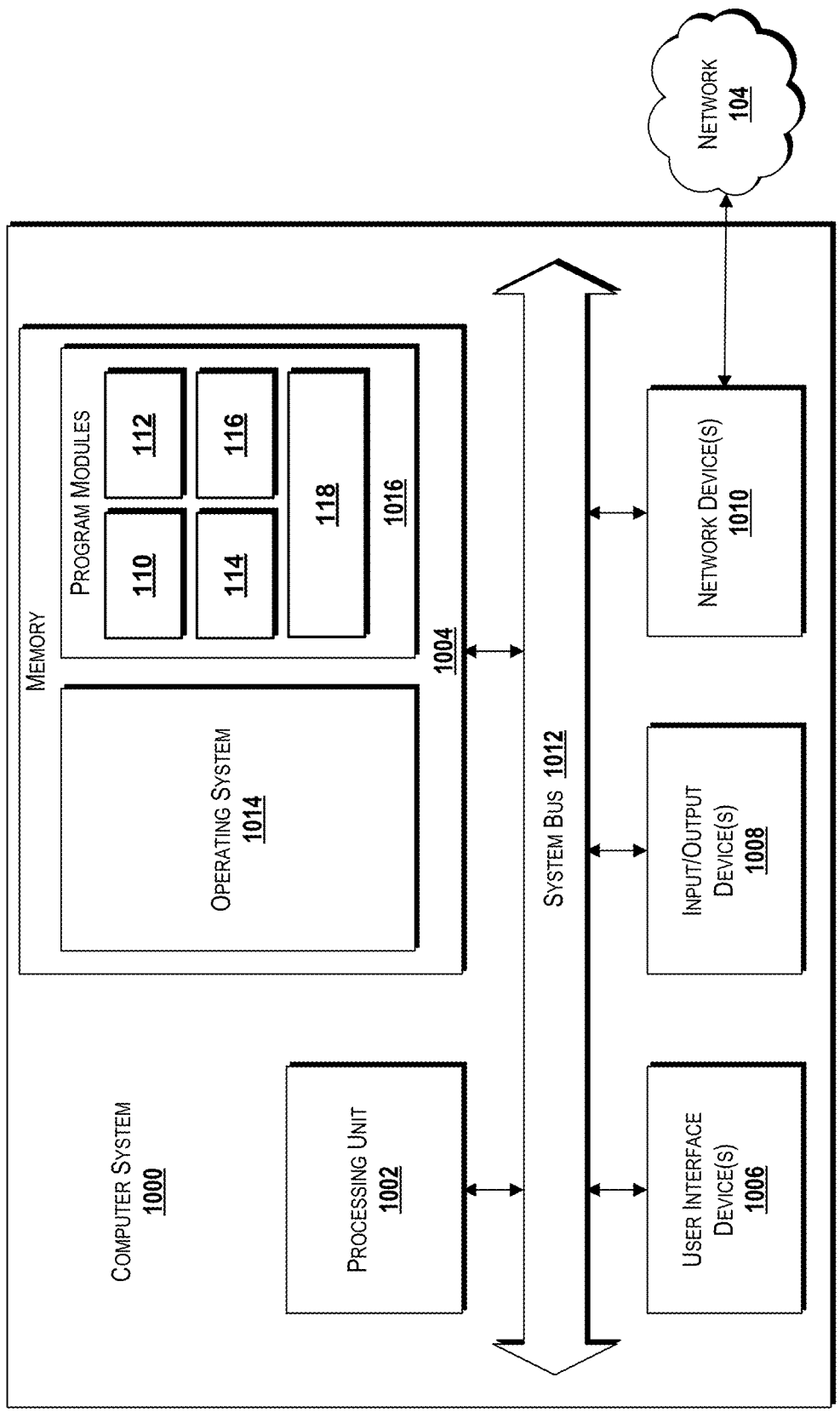
FIG. 10 is a block diagram illustrating an example computer system configured to provide a network virtualization policy management system, according to some illustrative embodiments of the concepts and technologies described herein.

FIG. 10 is a block diagram illustrating a computer system 1000 configured to provide the functionality described herein for a network virtualization policy management system such as the policy management system 106, in accordance with various embodiments of the concepts and technologies disclosed herein. The computer system 1000 includes a processing unit 1002, a memory 1004, one or more user interface devices 1006, one or more input/output ("I/O") devices 1008, and one or more network devices 1010, each of which is operatively connected to a system bus 1012. The bus 1012 enables bi-directional communication between the processing unit 1002, the memory 1004, the user interface devices 1006, the I/O devices 1008, and the network devices 1010.

The processing unit 1002 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 1004 communicates with the processing unit 1002 via the system bus 1012. In some embodiments, the memory 1004 is operatively connected to a memory controller (not shown) that enables communication with the processing unit 1002 via the system bus 1012. The memory 1004 includes an operating system 1014 and one or more program modules 1016. The operating system 1014 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 1016 may include various software and/or program modules described herein. In some embodiments, for example, the program modules 1016 can include the operation policy module 110, the physical resource management module 112, the virtual machine replication management module 114, the virtual machine relocation management module 116, and/or other modules, applications, services, or the like. These and/or other programs can be embodied in computer-readable media containing instructions that, when executed by the processing unit 1002, perform one or more of the methods 300, 400, 500, 600 described in detail above with respect to FIGS. 3-6. According to embodiments, the program modules 1016 may be embodied in hardware, software, firmware, or any combination thereof. Although not shown in FIG. 10, it should be understood that the memory 1004 also can be configured to store the virtual network function and virtual machine configuration design policy module 118, the request 108, the failure data 130, and/or other data, if desired.

By way of example, and not limitation, computer-readable media may include any available computer storage media or communication media that can be accessed by the computer system 1000. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1000. In the claims, the phrase "computer storage medium" and variations thereof does not include waves or signals per se and/or communication media.

The user interface devices 1006 may include one or more devices with which a user accesses the computer system 1000. The user interface devices 1006 may include, but are not limited to, computers, servers, personal digital assistants, cellular phones, or any suitable computing devices. The I/O devices 1008 enable a user to interface with the program modules 1016. In one embodiment, the I/O devices 1008 are operatively connected to an I/O controller (not shown) that enables communication with the processing unit 1002 via the system bus 1012. The I/O devices 1008 may include one or more input devices, such as, but not limited to, a keyboard, a mouse, or an electronic stylus. Further, the I/O devices 1008 may include one or more output devices, such as, but not limited to, a display screen or a printer.

The network devices 1010 enable the computer system 1000 to communicate with other networks or remote systems via a network, such as the network 104. Examples of the network devices 1010 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for providing a network virtualization policy management system have been disclosed herein. Although the subject matter presented herein has been described in language specific to computer structural features, methodological and transformative acts, specific computing machinery, and computer-readable media, the concepts and technologies disclosed herein are not necessarily limited to the specific features, acts, or media described herein. Rather, the specific features, acts and media are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
    detecting, at a processor, an event relating to a service;
    obtaining, by the processor, a first policy that defines allocation of hardware resources to host virtual network functions for the service;
    obtaining, by the processor, a second policy that defines deployment of the virtual network functions to the hardware resources;
    allocating, by the processor, the hardware resources based upon the first policy; and
    deploying, by the processor, the virtual network functions to the hardware resources based upon the second policy.

2. The method of claim 1, wherein the virtual network functions comprise virtual machines.

3. The method of claim 1, wherein the virtual network functions represent virtualized versions of the network service.

4. The method of claim 1, wherein allocating the hardware resources is a re-allocation of unused hardware resources.

5. The method of claim 1, wherein the second policy comprises a replication policy, and wherein deploying the virtual network functions comprises replicating the virtual network functions.

6. The method of claim 1, wherein the second policy comprises a relocation policy, and wherein deploying the virtual network functions comprises relocating the virtual network functions from failed hardware resources to the hardware resources.

7. The method of claim 1, wherein the second policy comprises a redundancy policy that defines deployment of the virtual network functions to the hardware resources to maintain a redundancy scheme.

8. The method of claim 7, wherein the redundancy scheme comprises a geo-redundancy requirement, an inter-site redundancy requirement, and an internal redundancy requirement.

9. A system comprising:
a processor; and
a memory that stores computer-executable instructions that, when executed by the processor, cause the processor to perform operations comprising:
detecting an event relating to a service;
obtaining a first policy that defines allocation of hardware resources to host virtual network functions for the service;
obtaining a second policy that defines deployment of the virtual network functions to the hardware resources;
allocating the hardware resources based upon the first policy; and
deploying the virtual network functions to the hardware resources based upon the second policy.

10. The system of claim 9, wherein the virtual network functions comprise virtual machines.

11. The system of claim 9, wherein the virtual network functions represent virtualized versions of the network service.

12. The system of claim 9, wherein allocating the hardware resources is a re-allocation of unused hardware resources.

13. The system of claim 9, wherein the second policy comprises a replication policy, and wherein deploying the virtual network functions comprises replicating the virtual network functions.

14. The system of claim 9, wherein the second policy comprises a relocation policy, and wherein deploying the virtual network functions comprises relocating the virtual network functions from failed hardware resources to the hardware resources.

15. The system of claim 9, wherein the second policy comprises a redundancy policy that defines deployment of the virtual network functions to the hardware resources to maintain a redundancy scheme, wherein the redundancy scheme comprises a geo-redundancy requirement, an inter-site redundancy requirement, and an internal redundancy requirement.

16. A computer storage medium having computer-executable instructions stored thereon that, when executed by a processor, cause the processor to perform operations comprising:
detecting an event relating to a service;
obtaining a first policy that defines allocation of hardware resources to host virtual network functions for the service;
obtaining a second policy that defines deployment of the virtual network functions to the hardware resources;
allocating the hardware resources based upon the first policy; and
deploying the virtual network functions to the hardware resources based upon the second policy.

17. The computer storage medium of claim 16, wherein the virtual network functions comprise virtual machines.

18. The computer storage medium of claim 16, wherein the virtual network functions represent virtualized versions of the network service.

19. The computer storage medium of claim 16, wherein allocating the hardware resources is a re-allocation of unused hardware resources.

20. The computer storage medium of claim 16, wherein the second policy comprises a redundancy policy that defines deployment of the virtual network functions to the hardware resources to maintain a redundancy scheme comprising a geo-redundancy requirement, an inter-site redundancy requirement, and an internal redundancy requirement.

* * * * *